(12) United States Patent
Hubbard et al.

(10) Patent No.: US 8,351,476 B1
(45) Date of Patent: Jan. 8, 2013

(54) QUASI-REMOTE LASER PULSE COMPRESSION AND GENERATION OF RADIATION AND PARTICLE BEAMS

(75) Inventors: Richard F. Hubbard, Burke, VA (US); Antonio C. Ting, Silver Spring, MD (US); Joseph R. Peñano, Fairfax Station, VA (US); Daniel F. Gordon, Waldorf, MD (US); Phillip A. Sprangle, Great Falls, VA (US); Bahman Hafizi, Bethesda, MD (US); Arie Zigler, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/529,167

(22) Filed: Jun. 21, 2012

Related U.S. Application Data

(60) Provisional application No. 61/499,220, filed on Jun. 21, 2011.

(51) Int. Cl.
*H01S 3/10* (2006.01)
*H01S 3/098* (2006.01)

(52) U.S. Cl. ..... 372/30; 372/25; 372/29.01; 372/29.014

(58) Field of Classification Search .................. 372/5–6, 372/25, 30, 29.01, 29.014; 250/458.1–488.1; 219/121.6–121.61
See application file for complete search history.

(56) References Cited

U.S. PATENT DOCUMENTS

| 8,102,594 | B2 * | 1/2012 | Xu et al. | 359/341.1 |
| 2007/0014317 | A1 * | 1/2007 | Liu et al. | 372/6 |
| 2007/0120070 | A1 * | 5/2007 | Kawano et al. | 250/458.1 |
| 2008/0059135 | A1 * | 3/2008 | Murugkar et al. | 703/11 |
| 2009/0257464 | A1 * | 10/2009 | Dantus et al. | 372/25 |
| 2011/0121202 | A1 * | 5/2011 | Li et al. | 250/459.1 |
| 2011/0200061 | A1 * | 8/2011 | Harter et al. | 372/18 |

OTHER PUBLICATIONS

P. Sprangle, J. Peñano, and B. Hafizi, "Optimum Wavelength and Power for Efficient Laser Propagation in Various Atmospheric Environments," Journal of Directed Energy 2, 71 (2006).

P. Sprangle, J. Peñano and B. Hafizi, "Propagation of intense short laser pulses in the atmosphere," Phys. Rev. E 66, 046418 (2002).

(Continued)

*Primary Examiner* — Jessica Stultz
*Assistant Examiner* — Phillip Nguyen
(74) *Attorney, Agent, or Firm* — Amy L. Ressing; Joslyn J. Barritt

(57) ABSTRACT

A system and methods for the quasi-remote compression and focusing of a moderate-intensity laser pulse to form a much higher intensity beam that can be directed at a target and used as a probe beam or used in a probe beam converter to generate other forms of electromagnetic radiation or energetic particles. A system for the quasi-remote propagation of high-intensity laser beams in accordance with the present invention comprises a main platform on which a first, "seed" laser pulse is generated, stretched, and amplified, and a remote platform, located at a distance from the main platform, which is configured to receive the amplified and stretched pulse and convert it into the high-intensity laser beam. The high-intensity laser beam in turn can then be converted into one or more probe beams directed at a target object.

36 Claims, 12 Drawing Sheets

OTHER PUBLICATIONS

P. Sprangle, J.R. Peñano, A. Ting, B. Hafizi and D.F. Gordon, "Propagation of Short, High-Intensity Laser Pulses in Air," Journal of Directed Energy 1, 73 (2003).

P. Sprangle, A. Ting, J. Peñano, R. Fischer and B. Hafizi, "Incoherent Combining and Atmospheric Propagation of High-Power Fiber Lasers for Directed-Energy Applications," IEEE J. Quantum Electron. 45, 138 (2009).

N.B, Delone and V.P, Krainov, "Tunneling and barrier-suppression ionization of atoms and ions in a laser radiation field," Physics—Uspekhi 41 (5) 469-485 (1998).

R.L. Fante, "Electromagnetic beam propagation in turbulent media," IEEE Proceedings 63, 1669 (1975).

Edmund B. Treacy, "Optical Pulse Compression with Diffraction Gratings," IEEE Journal of Quantum Electronics, vol. QE-5, No. 9, pp. 454-458 (1969).

K-Y. Kim, "Generation of coherent terahertz radiation in ultrafast laser-gas interactions," Phys. Plasmas 16, 056706 (2009).

T. Popmintchev, M-C Chen, P. Arpin, M.M. Murnane, and H.C. Kapteyn, "The attosecond nonlinear optics of bright coherent X-ray generation," Nature Photonics 4, 822 (2010).

* cited by examiner

QUASI-REMOTE LASER PULSE COMPRESSION AND GENERATION OF RADIATION AND PARTICLE BEAMS

CROSS-REFERENCE

This application is a Nonprovisional of and claims the benefit of priority under 35 U.S.C. §119 based on U.S. Provisional Patent Application No. 61/499,220 filed on Jun. 21, 2011, the entirety of which is hereby incorporated by reference into the present application.

TECHNICAL FIELD

The present invention relates to generation and propagation of laser beams, particularly to generation of high-intensity laser beams that are compressed in time and focused at a remote platform located at a distance from the laser pulse source. The invention also relates to the conversion of the laser pulse into other forms of electromagnetic radiation or to energetic particles at the remote platform

BACKGROUND

There is considerable interest in producing electromagnetic radiation or particle beams that can propagate to distant targets or areas and act as probes or sensors of those targets. These methods are often referred to as active detection or active remote sensing methods in that the probing beam generates a signature that is stronger or of a different nature than the normal passive signatures. However, in many cases, the device that produces that probing radiation is large or fragile, and the radiation or particle beam cannot propagate easily to the target. This is particularly true of penetrating electromagnetic radiation beams (e.g., x-rays, terahertz (T-rays), gamma rays) or energetic particle beams (electron, ion, or neutron). To a lesser extent, this also applies to ultraviolet radiation since the radiation is heavily absorbed in the atmosphere.

Most of these forms of penetrating radiation require a high voltage (HV) source and produce the probe beam by converting a portion of the energy of a "drive" beam through some sort of conversion process. For example, x-ray beams are usually produced by having a high energy electron beam strike a metal foil, producing x-rays through the well-known bremsstrahlung process. In other cases, neutrons can be generated by having an ion beam strike a suitable thin target. The electron or ion drive beams in these cases may be produced by having an intense, ultrashort laser strike a solid target or a cluster.

Active detection, inspection, or sensing methods generally fall into two broad operational classes. The first of these is generally known as remote, or standoff, active detection, while the second is generally referred to as local active detection. The detection signatures usually fall into two broad classes: imaging and spectroscopy. X-rays, T-rays, and energetic particles penetrate into materials and can be used as illumination sources to generate surface and subsurface images of objects and areas of interest. Materials also have spectroscopic signatures in the terahertz frequency range that can be used to determine chemical composition. The presence of certain elements or isotopes can also be deduced through the products or nuclear reactions that are initiated by subjecting an object to a beam of hard x-rays, ions, or neutrons.

In remote or standoff active detection, a probe beam is directed to a target area some distance away, and a return signature is detected by one or more detectors. Because the return signature is often isotropic, in many cases the detectors are situated on a separate platform closer to the target. For penetrating probe beam radiation, a drive beam is usually required to produce the probe beam, with the drive beam and probe beam usually being produced on the same platform or on separate platforms in close proximity to one another where the location of the drive beam generator is fixed relative to the probe beam generator. In general, the intensity of the probe beam drops as it propagates to the target due to its intrinsic divergence and its interaction with the atmosphere, generally limiting its useful range to a few tens of meters or less. In addition, there is often substantial collateral ionizing radiation, so that in many cases, the practical limit on range or detection speed is determined not by the system size or performance but by the allowable radiation dose for collateral ionizing radiation. In some standoff active detection methods, the probing radiation is produced at or close to the target. One example of such a method is laser-induced breakdown spectroscopy (LIBS), in which radiation is produced by the breakdown plasma itself, where the LIBS plasma may be produced on the surface of a target or by generating a localized spark in the air near the target. However, this radiation does not penetrate the target.

There also are a variety of ultrashort pulse laser (USPL)-based schemes that generate probe and signature radiation from nonlinear effects. These schemes can be used to generate pulsed radiation in the infrared (IR), ultraviolet (UV), or THz regimes which can be useful for spectroscopic detection. However, although THz radiation can penetrate thin materials in some cases, these forms of radiation generally are not highly penetrating. In addition, none of these schemes produce highly penetrating probe beams (e.g., x-rays or energetic particles) that require large ($>10^{17}$ W/cm$^2$) laser intensities for their production.

For local active detection operations, the HV power source, drive beam generator, probe beam converter, and detectors are all in close proximity to the target. In some cases, these components are sufficiently compact and lightweight that they can be part of a small, mobile system that can be moved close to the target. In some such cases, the entire system can fit on a small, unmanned platform, while in others, the system is man-portable and can be placed by a trained operator or special forces member. However, the primary problem in these scenarios is that the strength and penetration capability of the probe beam generated on such small, mobile platforms is generally severely limited, and so these systems do not have broad utility.

There is, of course, another class of local active detection systems where the source and detectors are fixed in place, and the objects to be examined are brought to the scanner. In these systems, such as those used in airport screening or cargo inspection, the system can be relatively large, but control over the objects or vehicles to be examined is required. These systems have basically the same architecture as the small local systems described above.

In a third class of devices, the prime power and drive beam generator are located on a large, distant platform or at a fixed location, and the drive beam propagates to a small, remote probe beam converter located near the target. This class of systems may be referred to as "quasi-remote" since the drive beam generator is remote, but the probe beam converter is local with respect to the target area.

An obvious advantage of such quasi-remote systems is that the drive beam power and energy can be substantially larger than in the small mobile systems described above. Compared with the first class of standoff detection approaches, a quasi-remote system may produce a much more intense probe beam on the target or area to be examined and strongly reduce the amount of collateral ionizing radiation.

However, propagating the drive beam to the probe beam converter presents fundamental challenges. In a fixed laboratory, industrial, or hospital setting, the drive beam can be transported to the probe beam converter in a vacuum, using external magnetic fields to confine the drive beam. Such an architecture has been employed, for example, in large synchrotron light source facilities and in hospitals using proton therapy for cancer treatment. However, the particle beam optics and vacuum systems are extremely complex and expensive, making this approach far too cumbersome in most cases to be considered a practical approach in a more open environment or in cases where the target area or object to be inspected is not at a fixed location.

If the drive beam is an electron or ion beam, it can in principle be propagated through the air to the probe beam converter. However, scattering in the atmosphere causes massive spreading of the beam spot size or radius within a few tens of meters of propagation. Very high power electron or ion beams may be propagated through the air in a self-pinched state that slows beam expansion, but scattering and beam-plasma instabilities impose severe restrictions on range, and the collateral radiation dose is probably unacceptable. Although this approach theoretically is possible, there have not been any demonstrated cases in which an electron or ion beam has been propagated any significant distance to a probe beam converter in the open atmosphere.

Ultrashort pulse lasers (USPL) offer a potentially attractive source for the drive beam in a quasi-remote architecture since the pulses can be propagated over substantial distances in the atmosphere, and at high intensities, the pulses can in principle be converted to almost any form of penetrating radiation or particle beam. In many cases, the probe beam converter for a USPL-based system is much more compact than conventional systems producing a similar beam. For example, in laser wakefield accelerators (LWFA), the acceleration length is typically three orders or magnitude shorter than in conventional linear accelerators. However, the laser intensity during propagation through the air is limited by ionization and non-linear effects to a level (<$10^{12}$ W/cm$^2$) that is orders of magnitude below that required to produce most forms of penetrating beams. The invention provides a method and approach to overcoming these limitations on the intensity of a propagating laser pulse using a quasi-remote architecture.

Quasi-remote detection systems may be thought of as a form of power beaming. In power beaming systems, energy from a large platform is transferred to a much smaller remote platform using a high energy laser or microwave beam. The typical goal is to provide sufficient energy to provide propulsion or power sensors or other energy consuming systems. The difference here is that for a laser drive beam, the intention is to produce very high peak power in a form that can be used to generate radiation or high energy particles while the total energy transported is generally modest.

There are a number of factors that can affect a laser pulse as it propagates through the air and degrade the ability to axially compress and focus the pulse. These include bulk processes such as absorption, scattering, and dispersion due to various molecular species, as well as interactions with aerosols. Other factors are processes that modify the refractive index of the air along the beam propagation path, such as laser induced processes (ionization, nonlinear focusing, thermal blooming) and naturally occurring fluctuations due to turbulence. These various effects are discussed below.

The laser beam can be scattered and absorbed by molecules in the air, especially water vapor molecules, and by aerosols. It turns out that for radiation in the 1 μm region of the spectrum aerosols are the predominant contributors to scattering and absorption. Taking the aerosol scattering coefficient $\beta_A \approx 0.3$ km$^{-1}$ the laser intensity drops by $$\exp(-\beta_A L) \approx \frac{3}{4}$$

over a range L=1 km. See P. Sprangle, J. Peñano, and B. Hafizi, "Optimum Wavelength and Power for Efficient Laser Propagation in Various Atmospheric Environments," *Journal of Directed Energy* 2, 71 (2006).

Air breakdown can cause ionization and plasma formation in the air, which in turn can modify the propagation characteristics of laser beams significantly. In the low intensity regime, breakdown proceeds via a multiphoton ionization process, while in the high intensity regime, tunneling ionization prevails. The corresponding ionization rates for n-photon ionization $W_{MPI}$ and tunneling ionization $W_{tun}$ are given by equations (1) and (2) below:

$$W_{MPI}(t) = \alpha_n I^n(t), \tag{1}$$

$$W_{tun}(t) = 4\Omega_0 \left(\frac{U_{ion}}{U_U}\right)^{5/2} \frac{E_H}{|E(t)|} \exp\left[-\frac{2}{3}\left(\frac{U_{ion}}{U_U}\right)^{3/2} \frac{E_H}{|E(t)|}\right], \tag{2}$$

where I(t) is the laser intensity, $\alpha_n$ and $\Omega_0$ are given coefficients, $U_{ion}(U_H)$ is the ionization potential of the molecule under consideration (hydrogen), $E_H$ is the hydrogenic electric field and E(t) is the laser electric field. See P. Sprangle, J. Peñano and B. Hafizi, "Propagation of intense short laser pulses in the atmosphere," *Phys. Rev. E* 66, 046418 (2002) ("Sprangle 2002"); P. Sprangle, J. R. Peñano, A. Ting, B. Hafizi and D. F. Gordon, "Propagation of Short, High-Intensity Laser Pulses in Air," *Journal of Directed Energy* 1, 73 (2003) ("Sprangle 2003") P. Sprangle, A. Ting, J. Peñano, R. Fischer and B. Hafizi, *IEEE J. Quantum Electron.* 45, 138 (2009) ("Sprangle 2009"); and N. B, Delone and V. P, Krainov, "Tunneling and barrier-suppression ionization of atoms and ions in a laser radiation field," *Physics—Uspekhi* 41 (5) 469-485 (1998).

By far the most abundant constituents of the atmosphere are $N_2$ and $O_2$. Although nitrogen molecules are nearly four times more abundant than oxygen molecules, the dominant air breakdown process is photoionization of $O_2$ since it is more readily ionizable (i.e., $U_{O_2}$=12.1 eV, $U_{N_2}$=15.6 eV). Based on these expressions it turns out that a ~ns laser pulse can propagate with little ionization so long as its intensity is $\leq 10^{13}$ W/cm$^2$ Another process affecting the propagation of a laser pulse as travels through the atmosphere is spreading of the pulse in time due to dispersion. A laser pulse of finite (initial) duration $T_0$ spreads as it propagates in the atmosphere as a result of the spread in the group velocity associated with the wavenumbers in the pulse. The distance over which an initially unchirped pulse nearly doubles in duration is given by $Z_{T0}=T_0^2/2|\beta_2|$, where $\beta_2$ is the group velocity dispersion parameter. Noting that $\beta_2 \approx 2.2 \times 10^{-31}$ s$^2$/cm for air at STP, it follows that for a 100 fsec pulse, $Z_{T0}$ is on the order of a few hundred meters, which is comparable to the ranges of interest here. Thermal blooming can be neglected since the time scales for heating of air and the resulting hydrodynamic flows are much longer than the duration of laser pulses of interest.

However, a frequency chirp imposed on the pulse also will affect its spreading. In the absence of nonlinear effects and in an homogeneous atmosphere, the pulse duration T(z) will vary with propagation distance z according to $$T(z) = T_0 \left[ \left( 1 + \beta(z) \frac{z}{Z_{T_0}} \right)^2 + \left( \frac{z}{Z_{T_0}} \right)^2 \right]^{1/2}. \quad (3)$$

See Sprangle 2002, Sprangle 2003, and Sprangle 2009, supra. This expression applies to a pulse whose amplitude has a Gaussian variation proportional to $\exp[-(1+i\beta)(t-z/v_g)^2/T^2]$ in the pulse variable $t-z/v_g$, where $V_g$ is the pulse group velocity and $\beta(z)$ is the chirp parameter defined such that the instantaneous frequency spread along the pulse is given by $2\beta(z)(t-z/v_g)^2/T^2(z)$. The full frequency chirp over the pulse duration [-T, T] is given by $\delta\omega_{full}=4\beta/T$. For a negative chirp parameter that is sufficiently large (in magnitude), the pulse duration can be made to decrease, i.e., pulse compression can take place.

In addition, air is a nonlinear medium with a refractive index that is weakly dependent on the laser intensity I. That is, $n=n_0+n_2 I$, where $n_0-1\approx 2\times 10^{-4}$ at STP and $n_2\approx 3\times 10^{-19}$ cm$^2$/W for ~ns laser pulses. This effect, known as the optical Kerr effect, is due to the nonlinear polarization of the bound electrons. One manifestation of the optical Kerr effect is self-focusing of a laser beam if the power exceeds a certain threshold, $P_k=\lambda_2/(2\pi n_0 n_2)$, which is $\approx 3$GW for air at STP and a laser wavelength $\lambda=1$ μm. Another nonlinear polarization effect arises from the dumb-bell shape of the diatomic molecules $N_2$ and $O_2$. The induced polarization of these molecules in the laser electric field leads to a rotational Raman effect that is of the same order of magnitude as the Kerr effect. Both of these effects can be avoided provided the power in the laser beam is well below 3 GW.

A powerful laser beam propagating in air can undergo filamentation. Growth of the instability associated with filamentation is expressed in terms of the B-integral, which can be expressed as $B \approx k L (n_2/n_0)I$, where k is the wavenumber, L is the propagation range, $n_0 \approx 1$ and $n_2 \approx 3\times 10^{-19}$ cm$^2$/W are the linear and nonlinear refractive indices, respectively, and I is the intensity. For a propagation range of 300 m it is necessary for the intensity to be $<10^{10}$ W/cm$^2$ to avoid filamentation of the laser pulse.

Atmospheric turbulence can be the most important process limiting the ability to compress and focus the pulse to high intensities. Turbulence degrades the phase fronts and leads to local hot spots. The instantaneous beam spot size increases (spreads) while the beam centroid wanders.

The propagation of laser beams in the atmosphere can be divided into the weak or strong turbulence regimes. Laser beam propagation characteristics, such as the spot size and centroid wander, depend on the turbulence regime, characterized by the Rytov variance $$\sigma_R^2 = 1.23 C_n^2 L^{11/16} \lambda^{-7/6} \quad (4)$$

where $\lambda$ is the wavelength, L is the propagation range, and $C_n^2$ is the refractive index structure constant which is a measure of the turbulence level. See L. C. Andrews, R. L. Phillips, *Laser Beam Propagation through Random Media*, 2$^{nd}$ Ed., SPIE Press, Bellingham, Wash., 2005, p. 263; J. W. Hardy, *Adaptive Optics for Astronomical Telescopes*, Oxford University Press, New York, N.Y., 1998, p. 89; and R. L. Fante, "Electromagnetic beam propagation in turbulent media," *IEEE Proceedings* 63, 1669 (1975).

Weak turbulence is characterized by $\sigma_R^2<1$. For the propagation ranges of interest here the Rytov variance is typically less than the unity. For a collimated beam in this limit, the characteristic displacement of the beam centroid, which is termed the beam wander, is given by $$\rho_w^2 = \frac{2.97 L^2}{k^2 \rho_0^{5/3} D^{1/3}} \quad (5)$$

where k is the wavenumber, $D=\sqrt{2}R_0$ is the aperture diameter, $R_0$ is the Gaussian spot size of the laser beam and $\rho_0=0.158 (\lambda^2/C_n^2 L)^{3/5}$. Wandering of the beam centroid takes place on a time scale defined by the Greenwood frequency $f_G$, where $f_G \approx V_{wind}/\rho_0$ and $V_{wind}$ is the wind speed. When the exposure (e.g., of a camera) is longer than the atmospheric coherence time $1/f_G$, the spot size is effectively larger than the actual, instantaneous (i.e., short-term), spot size. For a collimated beam the short-term beam spreading is given by $$\rho_s^2 \approx M^2 \frac{4L^2}{k^2 D^2} + \frac{D^2}{4} + \frac{4L^2}{k^2 \rho_0^2} \left[ 1 - 0.62 \left( \frac{\rho_0}{D} \right)^{1/3} \right]^{6/5} \quad (6)$$

where $M^2$ is the intrinsic beam quality. Note that $\rho_s=D/2=R_0/\sqrt{2}$ at L=0. From Equation (6), the effective turbulence-corrected beam quality is given by $$M_{eff}^4 = M^4 + \frac{D^2}{\rho_0^2} \left[ 1 - 0.62 \left( \frac{\rho_0}{D} \right)^{1/3} \right]^{6/5} \quad (7)$$

In summary, atmospheric turbulence causes fluctuations in the refractive index of the air and leads to spreading of the laser beam and wandering of the beam centroid. Both of these increase with increasing range and with increasing level of turbulence. These effects can be compensated for by employing adaptive optics techniques which, however, can be cumbersome and expensive. The alternative is to choose a propagation range that is short enough to give acceptable results.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a system and methods for the quasi-remote compression and focusing of a moderate intensity laser pulse produced at one location to a much higher intensity pulse at another location that can be directed at a target or used in a probe beam converter to generate other forms of electromagnetic radiation or energetic particles.

A system for the quasi-remote generation of high-intensity laser beams in accordance with the present invention comprises a main platform on which a first, "seed" beam is generated, stretched in time, and amplified, and a remote platform, located at a distance from the main platform, which is configured to receive the stretched laser pulse and convert it into the high-intensity laser beam. In some embodiments, the main platform is fixed and the remote platform is mobile such that there can be relative motion between them.

The main platform includes one or more electrical power sources for the entire system, a seed beam source, a pulse stretcher, a main amplifier including a pumping source, and beam director optics configured to aim the beam at one or more pulse compressors at the remote platform. The main platform may also include tracking location optics and ancillary electronics to precisely determine locate the position and orientation of the remote pulse compressor.

The seed beam source generates an initial beam, which may be in the form of a USPL laser pulse produced by a laser oscillator. Once the initial seed beam is generated, it is stretched and amplified at the main platform. In some embodiments, a chirp may be applied to the laser pulse, e.g., at the stretcher. The stretched and amplified pulse is configured to have a spot size and stretched length sufficiently large so that the resulting intensity of the propagating pulse is low enough to avoid or minimize the effects of plasma generation and nonlinear self-focusing.

The stretched and amplified pulse then travels through the atmosphere to be received at the remote platform. The remote platform can include beam capture optics, a pulse compressor, focusing and aiming optics that reduce the spot size of the compressed pulse so that it reaches a minimum at a particular focal location, and a probe beam converter, typically located at the focal position of the highest intensity or minimum spot size. The converter generates a probe beam that interacts with the target and its surroundings, producing signatures in the form scattered or secondary particles and/or radiation that can be received by one or more detectors located on the remote platform or on an a separate platform.

In some cases, the probe beam is generated in a single stage conversion process. For example, terahertz radiation, electron beams, or ion beams can generally be produced in a single stage. In other cases, the probe beam used as a drive beam to generate one or more high-energy beams such as x-rays, gamma rays, or neutron beams which in turn can be used for imaging and/or spectroscopy applications.

DETAILED DESCRIPTION

Figure 1:
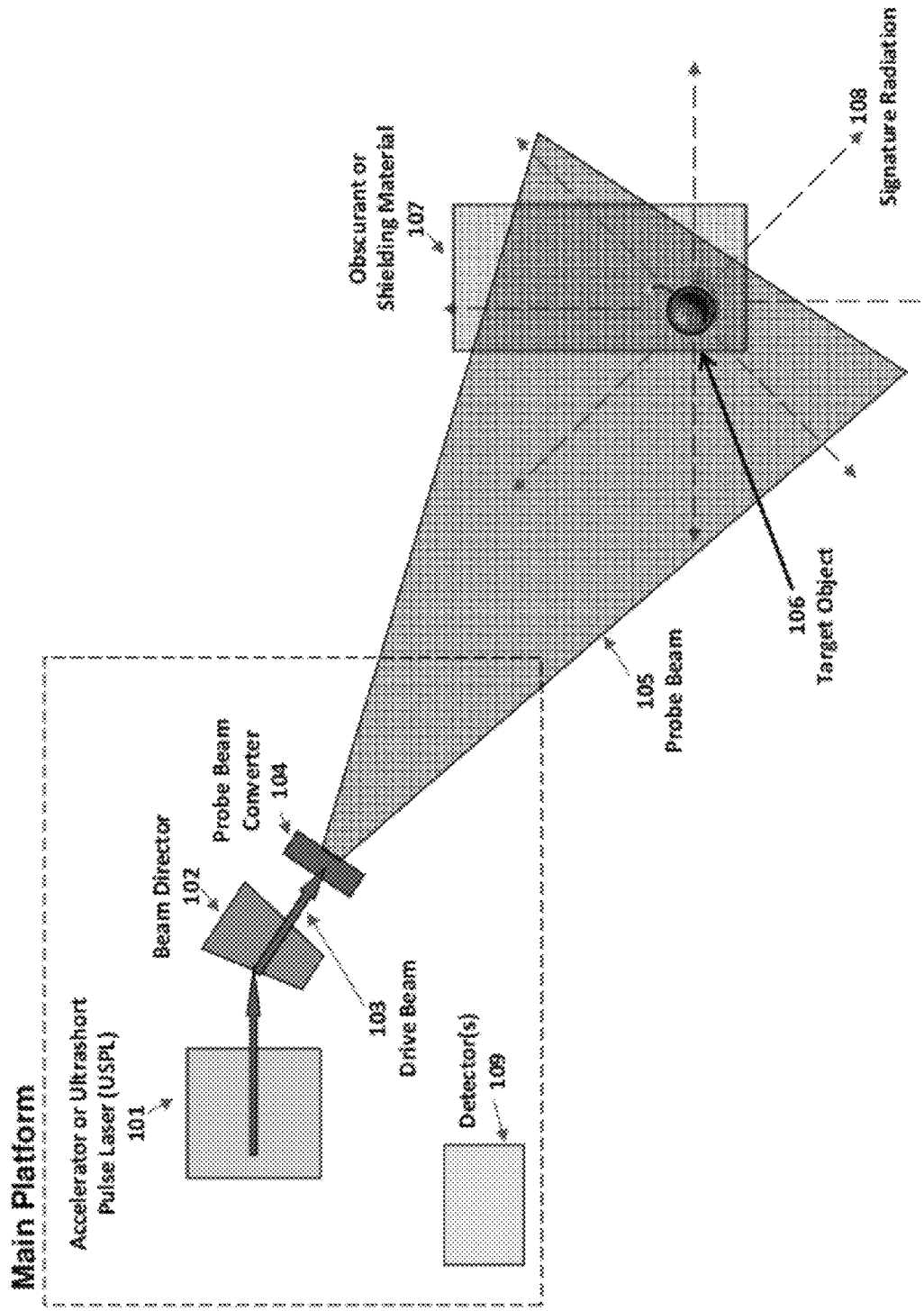
FIG. 1 is a block diagram depicting an exemplary configuration of a generic conventional standoff detection system having both a drive beam and a probe beam being generated from a single platform or location in accordance with the prior art.

The aspects and features of the p invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

As described in more detail below, the present invention provides a system and methods for the quasi-remote compression and focusing of a moderate intensity pulse produced at one location to a much higher intensity pulse at another location that can be directed at a target or used in a probe beam converter to generate other forms of electromagnetic radiation or energetic particles.

A system for the quasi-remote generation of high-intensity laser beams in accordance with the present invention comprises a main platform on which a first, "seed" beam is generated, stretched in time, and amplified, and a remote platform, located at a distance from the main platform, which is configured to receive the stretched laser pulse and convert it into the high-intensity laser beam. In some embodiments, the main platform is fixed and the remote platform is mobile such that there can be relative motion between them.

The main platform includes one or more electrical power sources for the entire system, a seed laser source, a pulse stretcher, a main amplifier including a pumping source, and beam director optics configured to aim the beam at one or more pulse compressors at the remote platform. The main platform may also include tracking location optics and ancillary electronics to precisely determine the position and orientation of the remote pulse compressor. The beam director may also include a tip-tilt system to correct for turbulence-induced beam wander, and adaptive optics to correct for turbulence-induced distortion of the stretched pulse wavefront.

The seed laser source generates an initial laser pulse in the form of a pulse known in the art. Once the initial seed pulse is generated, in accordance with the present invention it is stretched, chirped, and amplified at the main platform. The stretched and amplified pulse is configured to have a spot size and stretched length sufficiently large so that the resulting intensity of the propagating pulse is low enough to avoid or minimize the effects of plasma generation and nonlinear self-focusing. This pulse is directed towards the beam capture optics on the remote platform by the beam director and may be modified by a tip-tilt system or adaptive optics to compensate for turbulence effects.

The stretched and amplified pulse then travels through the atmosphere to be received at the remote platform. The remote platform can include beam capture optics, a pulse compressor, focusing and aiming optics that reduce the spot size of the compressed pulse so that it reaches a minimum at a particular focal location, and a probe beam converter, typically located at the focal position of the highest intensity or minimum spot size. The converter generates a probe beam that interacts with the target and its surroundings, producing signatures in the form scattered or secondary particles and/or radiation that can be received by one or more detectors located on the remote platform or on an a separate platform. The beam capture optics may also include adaptive optics components that correct for turbulence.

In some cases, the probe beam is generated in a single stage conversion process. For example, terahertz radiation, electron beams, or ion beams can generally be produced in a single stage. In other cases, the probe beam used as a drive beam to generate one or more high-energy beams such as x-rays, gamma rays, or neutron beams which in turn can be used for imaging and/or spectroscopy applications such as remote detection.

FIG. 1 illustrates a typical conventional standoff detection system in accordance with the prior art.

As shown in FIG. 1, a typical conventional standoff detection system in which both a drive beam and a probe beam are generated includes a drive beam generator, i.e., a laser such as an ultrashort pulse laser, along with a beam director and a probe beam converter. As noted above, in most cases all of the components are housed in a single platform, denoted in FIG. 1 as the "Main Platform" although in some cases the probe beam converter can be located on a separate platform located a very short distance from the drive beam generator, with the relative locations of the drive beam generator and probe beam generator being fixed.

Thus, in the conventional system illustrated in FIG. 1, a pulse from an ultrashort pulse laser (USPL) or particle beam accelerator 101 generates a laser pulse or particle beam that travels through a beam director 102 to become a drive beam 103. If the drive beam is a laser pulse produced by the chirped pulse amplification method, the USPL includes the seed laser, pulse stretcher, amplifier, and pulse compressor. Drive beam 103 is directed by beam director 102 to probe beam converter 104 where it is converted to probe beam 105. Probe beam 105 travels through the atmosphere to reach the object to be detected, shown in FIG. 1 as target object 106, which in some cases may be shielded by obscurant or shielding material 107. When struck by probe beam 105, target object 106 reacts, emitting signature radiation 108 which can then be detected by one or more detectors 109 which also are located on the Main Platform. The main platform also includes the power system (not shown) that provides power to the laser, the beam director, and the other components of the system. In some cases, the drive beam is an electron or ion beam that is produced directly in an accelerator before reaching Beam Director 102, with the accelerator replacing the USPL in such cases.

A conventional local detection system would have a configuration similar to that shown in FIG. 1, except that the object or area being examined would be located near the probe beam converter.

The above-described conventional system has several drawbacks. Some of these drawbacks result from the effects of the atmosphere on probe beam 105 as it travels to the target, e.g., the scattering, ionization, spreading, and wander effects described above, which in many cases can cause the intensity of the probe beam to degrade substantially as it propagates to the target.

As described in more detail below, the present invention solves these problems by providing a system in which the prime power and drive beam generator are located on a large, distant platform, with the drive beam propagating to a small remote pulse compressor and probe beam converter on a remote platform located near the target. The fundamental approach proposed in this invention is to propagate the stretched drive laser pulse in the air at a sufficiently low intensity to avoid ionization and nonlinear effects and then compress and focus it to a much higher intensity before it enters the probe beam converter.

Figure 2:
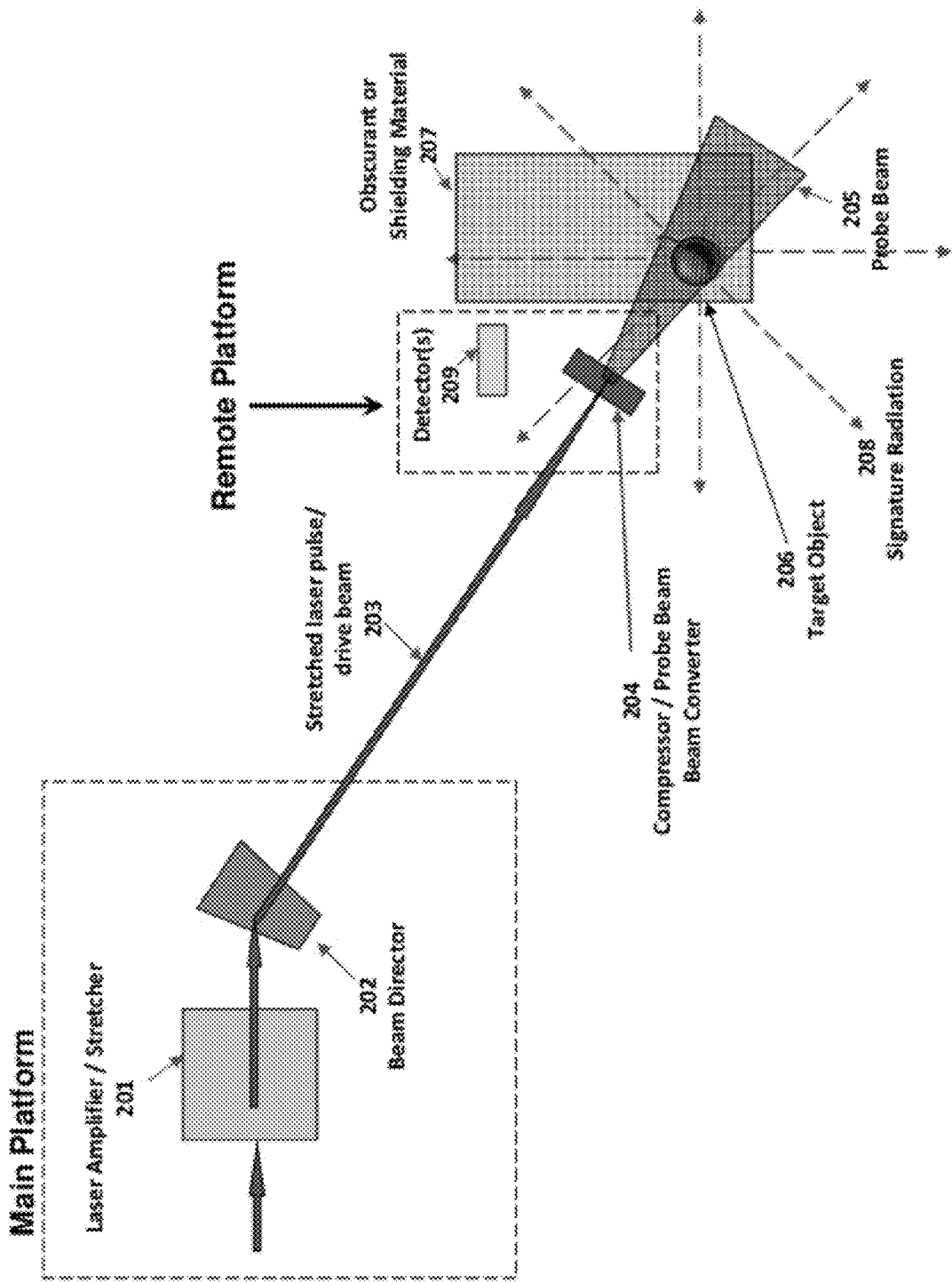
FIG. 2 is a block diagram depicting an exemplary configuration of a standoff detection system comprising a quasi-remote pulse compression system and probe beam converter.

FIG. 2 illustrates aspects of an exemplary configuration of a quasi-remote pulse compression system in accordance with the present invention. As noted above, a system in accordance with the present invention includes two platforms, a main platform on which is housed components for generating the drive beam and a remote platform on which is housed components for generating the probe beam. As described in more detail below, in accordance with the present invention, a moderate intensity stretched pulse is generated from the main platform and propagates to the remote platform where it is compressed and focused to form a high intensity beam that can be directed at a target or into a probe beam converter.

Thus, as illustrated in FIG. 2, the main platform includes a beam source (not shown), amplifier/stretcher 201 and beam director 202. In accordance with the present invention, an initial "seed" beam, for example, a USPL laser pulse produced by an oscillator, is generated at the main platform to form a drive beam for the detection system. Laser amplifier/stretcher 201 is configured to receive the USPL laser pulse, stretch and amplify it to form stretched and amplified drive beam 203 which is directed by beam director 202 to the remote platform. In some embodiments, a frequency chirp can be applied to the pulse, e.g., by amplifier/stretcher 201 configured to apply such a chirp.

At the remote platform, the stretched and amplified drive beam 203 enters compressor/probe beam converter 204, where it is converted into probe beam 205 in a manner described in more detail below. Probe beam 205 then impacts its intended target, e.g., target object 206, which may be in the open or may be behind an obscurant or shielding material 207. As a result of being impacted by probe beam 205, target object 206 emits signature radiation 208 which can be received and processed at one or more detectors 209. In the system of the present invention, these detectors can be located on the remote platform, thus allowing them to be placed sufficiently close to the target so that any signatures from the target can be detected.

In addition, as can be seen from a comparison of FIG. 2 to FIG. 1, probe beam 205, generated at a remote platform closer to the target in accordance with the present invention, is much tightly focused than probe beam 105, generated at a main platform far from the target. In addition, as noted above, while probe beam 105 can suffer a significant loss of intensity as it propagates through the atmosphere to the target, while the effects of the atmosphere on probe beam 205 are significantly reduced because it does not have to travel as far to reach the target. Thus, probe beam 205 can produce much stronger signatures from the target than those produced by probe beam 105. In addition, because it does not suffer the same loss of intensity as does conventionally generated probe beam 105, probe beam 205 generated in accordance with the present invention can enable the production of adequate signatures with far fewer energetic particles or less radiation than in conventional systems.

In most embodiments, the remote platform will be located at a distance from the main platform such that fast steering corrections of the drive beam from the main platform to the remote platform are required, e.g., to correct for relative motion between the main and remote platforms or to correct for turbulence-induced beam wander. Thus, in many embodiments, the remote platform will be located about 50 to 300 meters away from the main platform, though in other embodiments, the remote platform can be located at greater distances, limited only by line of sight and by degradation of the stretched pulse as it propagates to the remote platform. The main platform and the remote platform will usually be mobile with respect to one another, with the main platform, which houses the larger, heavier components of the system, being fixed while the remote platform being mobile, though other configurations, e.g., where both are mobile with relative movement being possible between them, may be used.

In addition, in some embodiments, one main platform may serve multiple remote platforms, each remote platform generating its own corresponding probe or other high energy beams based on the probe beam compressor/converter components located on the remote platform.

An exemplary configuration of components on the main platform and remote platform in a chirped pulse quasi-remote pulse compression system in accordance with the present invention will now be described in more detail with reference to the block diagrams shown in FIGS. 3A and 3B.

Primary system components: The basic components of an exemplary embodiment of a main platform in a chirped pulse quasi-remote pulse compression system in accordance with the present invention are illustrated by the block diagrams shown in FIG. 3A.

Figure 3A:
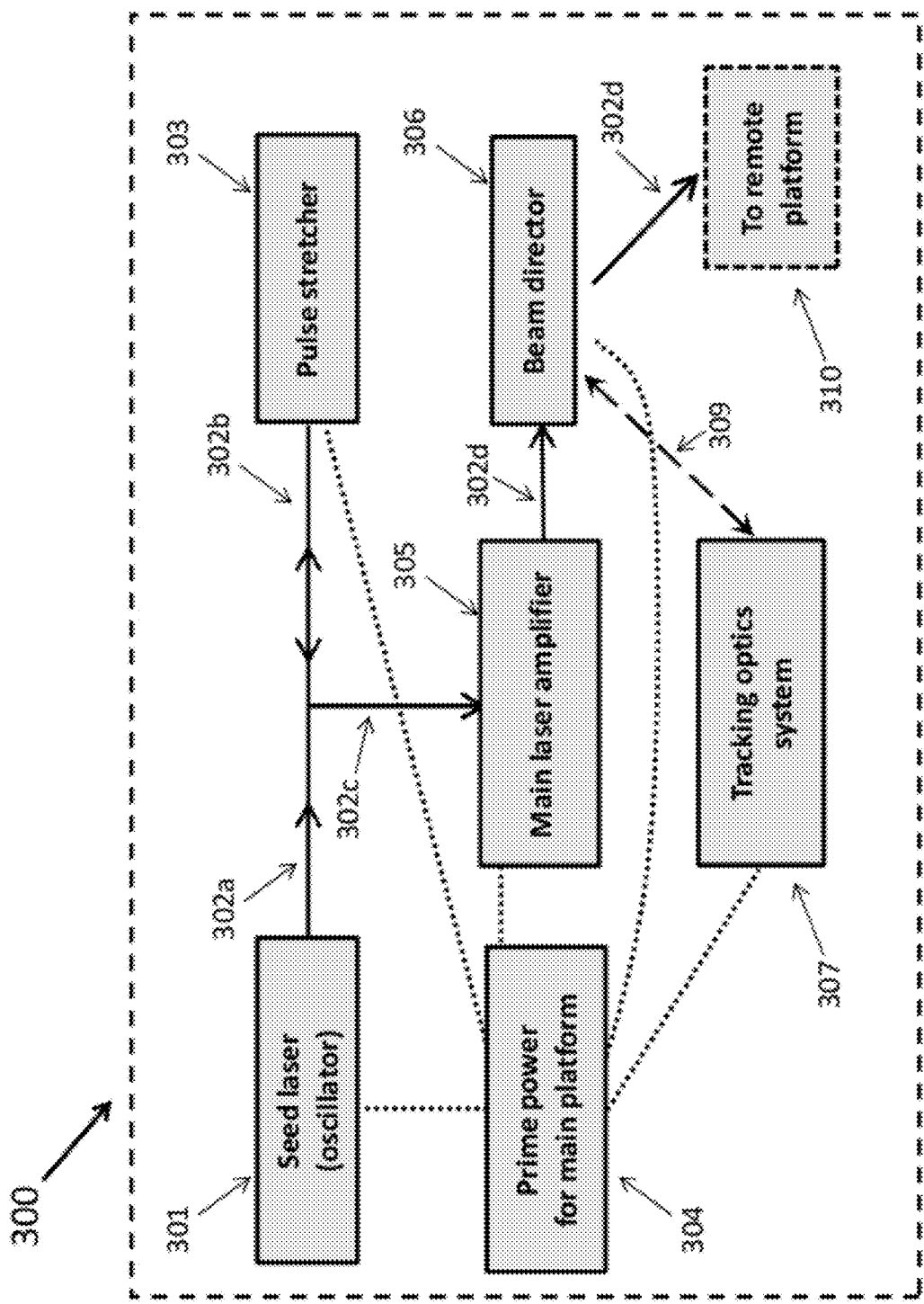
FIGS. 3A and 3B are block diagrams further illustrating aspects of an exemplary configuration of a main platform (FIG. 3A) and a remote platform (FIG. 3B) in a quasi-remote pulse compression system in accordance with the present invention.
Figure 3B:
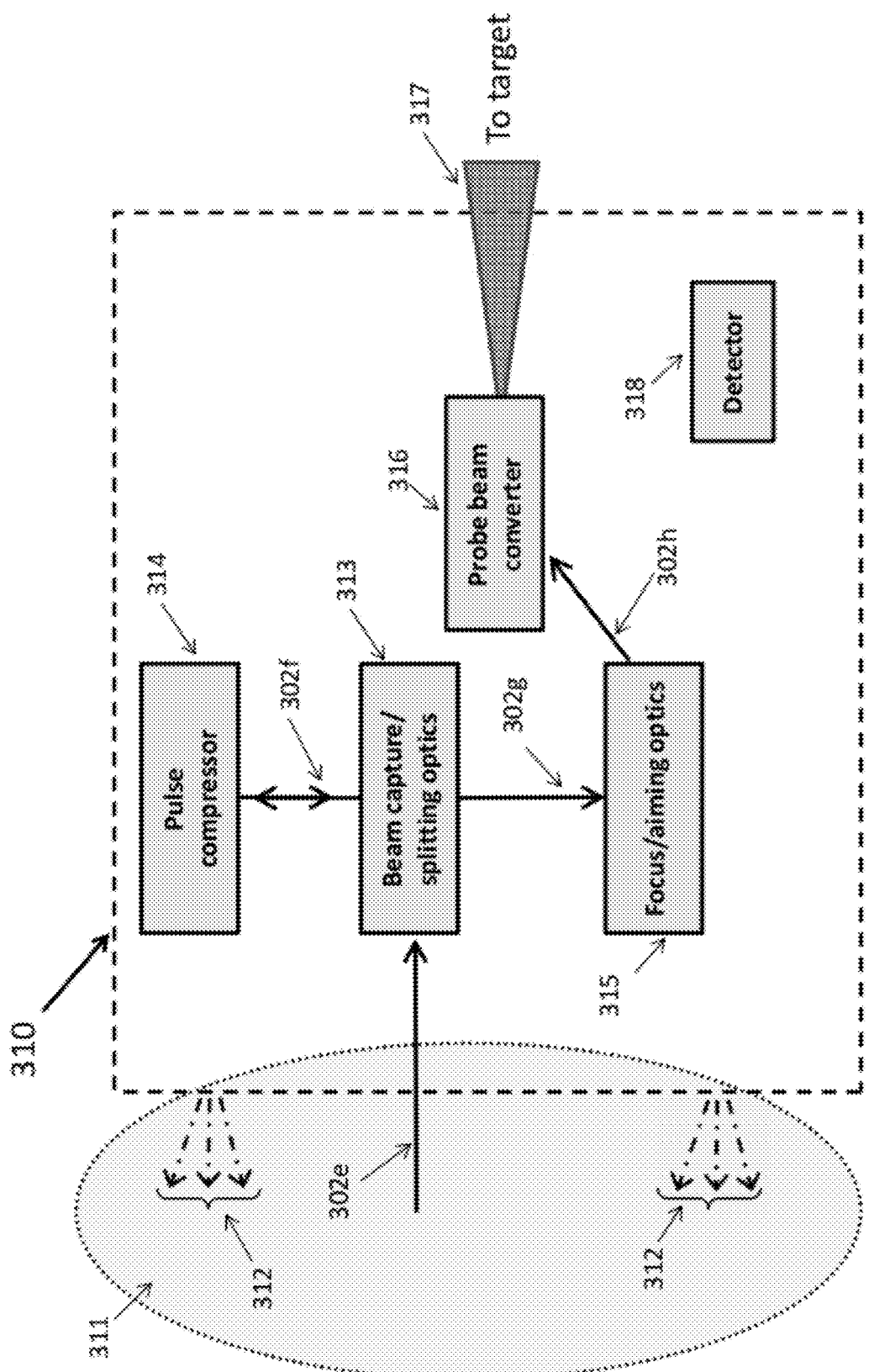

As illustrated in FIG. 3A, the components on the main platform 300 can include prime power source 304, which provides electrical power to the most energy intensive components of the system; seed laser 301, which may be in the form of an oscillator or any other suitable laser generation apparatus; pulse stretcher 303, which may be in the form of a grating pair; main laser amplifier 305, which can include a bulk large bandwidth amplification material such as Ti:sapphire, a large bandwidth doped optical fiber, and a pumping source such as a diode or argon ion laser; and beam director optics 306 configured to aim the beam at one or more pulse compressors located on remote platform 310 shown in more detail in FIG. 3B. The main platform 300 may also include tracking optics system 307 and other ancillary electronics to precisely determine locate the position and orientation of the remote compressor.

FIG. 3A also shows the electric connections between the power supply and main components (shown in FIG. 3A by dotted lines), and communication link 309 between beam director 306 and tracking optics system 307.

In addition, FIG. 3A shows the laser paths 302a/302b/302c/302d though the main platform and path 302e from the main platform to the remote platform, while FIG. 3B shows the laser path 302e of the beam received at the remote platform and paths 302f/302g/302h of the beam as it travels through the remote platform.

Table 1 below summarizes the characteristics of the laser pulse as it travels through a of a quasi-remote pulse compression system in accordance with the present invention and gives the pulse energy (small or amplified), pulse length (stretched or compressed) and beam size (expanded or focused) of the pulse after it leaves various components on each platform.

TABLE 1

Properties of laser pulse at the end of various stages
Component numbers refer to components in FIGS. 3A and 3B

| Stage | Pulse Energy | Pulse Length | Beam Size | Intensity |
|---|---|---|---|---|
| Seed laser (301) | Small | Compressed | Large | Small |
| Stretcher (303) | Small | Stretched | Large | Very small |
| Main amplifier (305) | Moderate/large | Stretched | Large | Moderate |
| Beam director (306) | Moderate/large | Stretched | Large | Moderate |
| Beam capture optics (313) | Moderate/large | Stretched | Large | Moderate |
| Pulse compressor (314) | Moderate/large | Compressed | Large | Moderate |
| Focusing and aiming optics (315) | Moderate/large | Compressed | Small/tiny | Large/huge |

As shown in Table 1 and as described in more detail below, the properties of the laser pulse in terms of energy, beam spot size, pulse length, and intensity vary substantially as the beam progresses through the various stages shown in FIGS. 3A and 3B. For example, the stretched pulse length and small intensity of the pulse after the pulse leaves stretcher 303 is required to avoid damage to the amplifier, while the large beam size and stretched pulse length of the pulse after it leaves beam director 306 is required to avoid plasma formation and non-linear effects in the air as the pulse propagates to the remote platform. Once the pulse is captured at the remote platform, it can be compressed in time and focused to very high intensity before entering the probe beam converter.

Thus, in accordance with the present invention, an initial "seed" laser pulse is generated in seed laser 301. The seed pulse is very short, typically tens of femtoseconds, and has very low energy, typically less than $10^{-9}$ J. The seed pulse travels from seed laser 301 via laser path 302a to pulse stretcher 303 where the pulse is stretched in time by several orders of magnitude. In some embodiments, a frequency chirp is applied to the pulse, e.g., by pulse stretcher 303 which is configured to apply such a chirp to the pulse. The stretched pulse then travels via path 302b back from pulse stretcher 303 and then via path 302c to amplifier 305 where the stretched pulse is amplified to raise its energy and power by many orders of magnitude. As noted above, stretching the pulse in time is essential to avoid damage to the amplifier. The stretched and amplified pulse then travels via path 302d from amplifier 305 to beam director 306, where it is directed along path 302e and travels through the atmosphere to remote platform 310, aspects of which are shown in more detail in FIG. 3B. Since the remote platform may be mobile, a tracking optics system 307 may be required to provide precise location and alignment information to the beam director 306. Beam director 306 may include fast steering mirrors and may also include one or more tip/tilt devices to correct for turbulence-induced beam wander and, if necessary, may further include adaptive optics to correct for turbulence-induced distortion of the pulse wave fronts.

In accordance with the present invention, the stretched drive beam pulse generated at main platform 300 travels via path 302e to remote platform 310 through atmosphere 311 and forms the drive beam for the generation of a probe beam at the remote platform. The expanded/stretched pulse that propagates to the remote platform has an intensity far below that required for probe beam conversion. Beam spot size is generally larger than 1 cm, and the pulse length is several orders of magnitude longer than in the final compressed pulse. In most cases, there will not be any system components or optics between the main platform 300 and remote platform 310, although one could for example place an additional minor at an intermediate location to overcome line of sight limitations. In addition, the stretched pulse is expanded so that it propagates with a sufficiently large spot size so that the plasma formation and nonlinear effects noted above are eliminated or at least minimized.

After it propagates through the atmosphere, the stretched pulse is received at the remote platform. Aspects of an exemplary embodiment of a remote platform in accordance with the present invention are illustrated by the block diagram shown in FIG. 3B.

As illustrated in FIG. 3B, such a remote platform 310 can include beam capture/splitting optics 313, pulse compressor 314, focus/aiming optics 315, and probe beam converter 316. In some cases the stretched drive beam pulse may optionally be guided to the remote platform by one or more beacons 312 which may assist with alignment of the drive beam and which in some cases may be used with an adaptive optics system to correct for the effects of turbulence on the beam as it travels through the atmosphere.

When it reaches remote platform 310, the drive beam traveling on laser path 302e is received by beam capture/splitting optics 313 which corrects the pulse for minor aiming errors and may also modify the pulse phase fronts using standard adaptive optics techniques before it enters pulse compressor 314 via laser path 302f. Pulse compressor 314 can include a grating pair, prism, grism (combination of a prism and a grating), or any other suitable pulse compression optics that causes the tail of the pulse to catch up with the head at a particular location, thus reducing the pulse length. Once it is compressed, the laser pulse—which is still considered to be a drive beam at this stage—travels via path 302g to focus/aiming optics 315, which then directs the pulse via path 302h to probe beam converter 316, which is typically located at the focal position of the highest intensity or minimum spot size of the compressed laser pulse. As described in more detail below, probe beam converter 316 can take any suitable form to convert the drive beam to the desired probe beam, such as terahertz, x-ray, or gamma ray radiation or energetic particles (electrons, ions, or neutrons).

In addition, depending on the characteristics of the probe beam desired, the input drive beam pulse may need to meet certain threshold characteristics, such as a minimum pulse intensity, maximum spot size, or total pulse energy, and such characteristics in turn may affect the configuration of one or more components on the remote platform. For example, if the required pulse intensity for the probe beam converter is sufficient to cause substantial ionization of the air or Kerr effect focusing in air, that component, along with the focusing optics and possibly the compression optics must be under vacuum.

Once it is received from focusing/aiming optics 315, in accordance with the present invention, probe beam generator 316 generates probe beam 317. The probe beam generator can have one or more components or stages, including a gas jet, a capillary discharge, or a thin foil necessary to produce the desired form of probe beam. Probe beam 317 interacts with the target and its surroundings, producing signatures in the form of scattered or secondary particles and/or radiation which can be received and processed by one or more detectors 318, which may be located on the remote platform or on a separate platform.

As noted above, the he properties of the laser pulse in terms of energy, beam spot size, pulse length, and intensity vary substantially as the beam progresses through the various stages shown in FIGS. 3A and 3B. At the point where the pulse has been focused from the focusing/aiming optics 315 into the probe beam converter, the laser pulse intensity may exceed $10^{18}$ W/cm$^2$, and the pulse length may be less than 100 femtoseconds. Although laser pulses in laboratory settings are routinely focused to spot sizes of 10 microns or less, turbulence and alignment limitations are likely to result in a substantially larger spot size at the probe beam converter. Since most of the applications of interest require a substantial flux of radiation or beam particles, one may in principle compensate for the larger spot size by increasing the energy of the drive beam.

Grating pair pulse compressor: A central component of a chirped pulse quasi-remote pulse compression system in accordance with the present invention is pulse compressor 314 on remote platform 310. An ideal compressor takes a positively chirped pulse as an input and produces a transform limited pulse as an output. Grating pair compressors having two parallel gratings and a retro-reflector are the most widely used, particularly for applications requiring very short pulses. In other cases, a folded compressor having a single grating with two retro-reflectors can be used. In still other cases, compressors either having prisms in place of gratings or having combined gratings and prisms (so-called "grisms") can be used.

Figure 4:
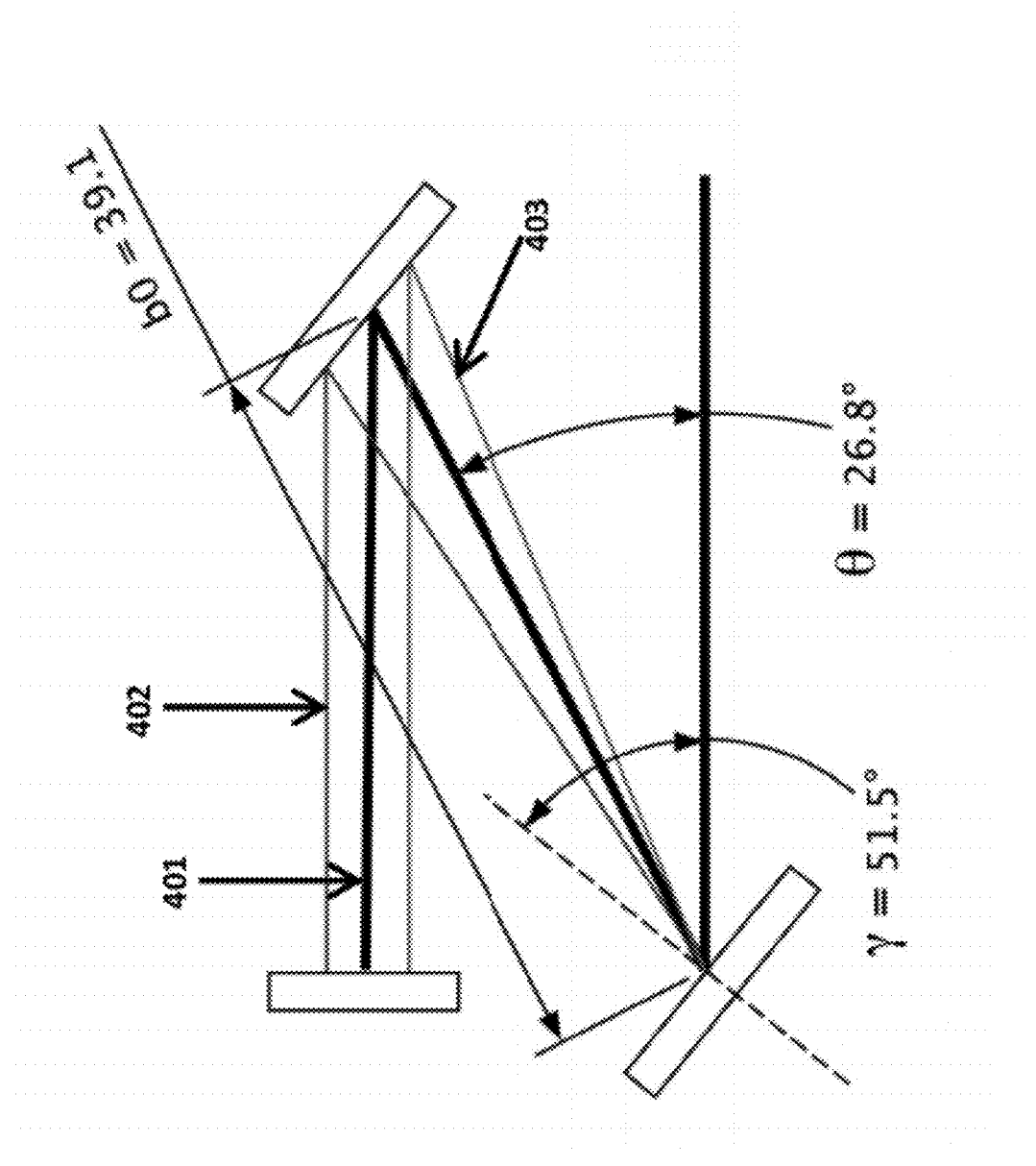
FIG. 4 is a block diagram illustrating aspects of an exemplary pulse compressor used in a quasi-remote pulse compression system in accordance with the present invention.

A scale drawing of the Ti:sapphire Femtosecond Laser ("TFL") compressor at the Naval Research Laboratory, which represents an exemplary embodiment of a grating pair compressor suitable for use in the system of the present invention, is shown in FIG. 4. In this particular compressor, the gratings have 1500 lines per millimeter, are rectangular in shape (14×10×2 centimeters), and are separated by about 40 centimeters. As shown in FIG. 4, ray 401 corresponds to the central wavelength of the pulse, with rays 402 and 403 corresponding to the higher and lower frequencies, respectively. The gratings in this compressor are parallel, and as a result, all rays incident on the first grating are parallel to all rays reflected from the second grating. This means a plane mirror can be used to make the rays retrace their exact path back through the system. This causes the output beam to have the same spot size and collimation as the input beam. This also preserves whatever spatial chirp is on the input beam (preferably none). In the TFL compressor, the mirror is replaced by a retro-reflector so that the output beam is displaced vertically and can be "picked off" without interfering with the input beam.

The effect of the compressor on the pulse length is due to the fact that the length of the path taken through the system depends on the frequency of the rays. This is usually expressed in terms of the frequency dependence of the phase delay. The expression for the phase associated with a given ray after a single pass is given by $$\phi = \frac{\omega}{c} b(1 + \cos\theta) - 2\pi g G \tan(\gamma - \theta)$$

where $\omega$ is the frequency of the ray, b is the distance between the gratings measured along the ray's trajectory, $\theta$ is the angle between the incident and diffracted ray, g is the groove frequency, G is the distance between the gratings measured along the normal, and $\gamma$ is the angle of incidence on the first grating. See Edmund B. Treacy, "Optical Pulse Compression with Diffraction Gratings," *IEEE Journal of Quantum Electronics*, Vol. QE-5, No. 9, pp. 454-458 (1969). The derivatives of the phase delay with respect to frequency determine the effect of the compressor on the pulse, with the zeroeth derivative being just an arbitrary constant. The first derivative corresponds to the phase advance in a dispersionless medium, and has no effect on the pulse shape. The second derivative corresponds to group velocity dispersion (GVD) which determines the pulse length to lowest order. The third derivative corresponds to third order dispersion (TOD) which affects both the pulse length and pulse shape. By proper alignment of the compressor both GVD and TOD can be eliminated. The higher derivatives will generally be non-zero, but their effect is small.

Probe beam converter: As noted above, the probe beam converter may take many forms, depending on the desired form of radiation or energetic particle beam. An advantage of the present invention is that it allows the laser amplifier and other large components to be located a substantial distance from the probe beam generator and allows the probe beam generator to be located closer to the targets or objects of interest.

The probe beam convertor can take any form suitable to produce the desired probe beam or radiation. In general, the probe beam converter may be considered a target or target assembly that intercepts the focused laser pulse and converts its energy to another form. Solid targets may include thin foils with one or more layers, wires, or bulk materials. Liquid targets may be in the form of droplets or streams. The most common gaseous targets for probe beam generation are pulsed gas jets, which may be shaped to produce a desired density profile or seeded with trace materials. Gas cells have also been used as targets. Clusters, which are "nanoparticles" typically containing hundreds or thousands of weakly-bound atoms, offer another class of targets. Finally, plasmas have also been used as probe beam converters, with the most common example being capillary discharge plasmas used in laser wakefield accelerators.

Some examples of the various ways of producing energetic particles or probing radiation in accordance with the present invention are given below.

(a) Ultraviolet (UV): Ultraviolet radiation does not generally propagate long distances in the atmosphere. However, it may be produced with an ultrashort pulse laser through the nonlinear generation of harmonics of the laser fundamental frequency. Third harmonic generation is particularly efficient and produces UV radiation that is potentially useful for UV fluorescence of biological or chemical threats. Much shorter wavelengths have been produced from high harmonic generation, though the amount of energy in a particular wavelength is small. UV may also be produced by the hot plasma associated with laser induced air breakdown. An important advantage associated with the quasi-remote architecture is that both the UV source and the detector are close to the target, so signal strengths are substantially higher than in standard standoff detection schemes.

(b) Terahertz (THz): Terahertz radiation can be produced by a high-intensity pulse generated in accordance with the present invention in a number of ways. For example, coherent THz radiation can also be generated in air by ultrafast, two-color laser-gas interaction using a probe beam generator comprising a gas target, in such a case a laser beam and its frequency-doubled counterpart mix to ionize the gas and induce a photoelectron current that can be the source for the THz radiation. See K-Y. Kim, "Generation of coherent terahertz radiation in ultrafast laser-gas interactions," *Phys. Plasmas* 16, 056706 (2009). In other embodiments, tunable, high peak power terahertz radiation can be generated by optical rectification of a short modulated laser pulse in a probe beam generator comprising a GaAs target by employing a collinear type II phased-matched interaction. See D. Gordon, A. Ting, I. Alexeev, R. Fischer, P. Sprangle, C. Kapetenakos, and A. Zigler, "Tunable, high peak power terahertz radiation from optical rectification of a short modulated laser pulse," *Optics Express* 14, 6813 (2006).

THz radiation may also be a by-product of laser wakefield accelerators, which are discussed in (e) below. It is also possible to produce THz from an air plasma located near the target. An important advantage of the quasi-remote architecture is that the laser power may be far higher. Also, the location of the THz source is clearly defined by the remote platform. Terahertz radiation can penetrate thin materials and is potentially useful for both imaging and spectroscopy. However, THz radiation suffers from severe attenuation in the atmosphere, so having the source and detectors close to the target is clearly advantageous.

(c) X-rays (broadband): X-rays are particularly useful for detection and remote sensing, both for imaging and spectroscopy. Intense, ultrashort laser pulses may produce a broad spectrum of x-rays through the interaction with solid or gaseous targets through a variety of mechanisms. Of particular interest is the possibility of producing an electron beam from a laser-plasma accelerator and then generating broadband bremsstrahlung radiation from the interaction of that electron beam with a solid target, for example, as discussed in (e) below. In most cases, it is not necessary to generate extremely high electron beam energies (10 s of MeV or more), but it is important to maximize the electron beam charge. Liquid droplets and atomic clusters are other targets that can efficiently convert laser energy to x-rays.

(d) X-rays (narrowband): For spectroscopic detection techniques it is often desirable to have an x-ray source with a narrow range of energy. Characteristic kilovolt x-rays are produced in the interaction with lasers and solid targets, but these discrete lines are mixed with broadband radiation. Discrete characteristic gamma rays (hard x-rays) may also be produced by the interaction of a multi-MeV ion beam with a solid target. The characteristic gamma ray from protons striking a fluorine ($^{19}$F) target has been proposed as an active source for active detection of fissile material. Methods for producing MeV ion beams from an ultrashort laser are discussed in (f) below. In these cases, the energy of the x-rays are determined by the target material.

It is clearly more desirable to be able to tune the energy of the narrowband x-ray source. A particularly elegant approach is to generate a high energy electron beam with a laser wakefield accelerator (LWFA) and then scatter the electron beam off a long laser pulse through Thomson scattering. This produces radiation with energy $E_s = 4\gamma_0^2 hc/\lambda_s$, where $\gamma_0$ is the relativistic factor of the LWFA electron beam, h is Plank's constant, c is the velocity of light, and $\lambda_s$ is the wavelength of the scattering laser. A 700 MeV LWFA electron beam scattering off a 1 micron wavelength laser produces photons with energies of approximately 10 MeV, which are potentially useful for active detection of fissile material.

Narrowband x-rays can also be produced using High-Harmonic Generation (HHG). Attosecond bright coherent X-ray generation has been demonstrated by the group led by Margaret M. Murnane. See T. Popmintchev, M-C Chen, P. Arpin, M. M. Murnane, and H. C. Kapteyn, *Nature Photonics* 4, 822 (2010). The physics of this technique combines the attosecond response of atoms driven by intense laser fields with the macroscopic extreme nonlinear optics of phase matching, thus realizing a coherent, tabletop version of the Roentgen X-ray tube.

(e) Energetic electrons: As noted above, if the intensity of the compressed/focused laser pulse is sufficiently high, energetic electrons may be produced through a variety of mechanisms and targets. Solid foil or wire targets produce electrons with a broad spread in energy and angle. Directed beams of higher energy may be produced through laser wakefield accelerator (LWFA) configurations. The simplest way to do this is to focus the laser pulse onto a gas jet, which can produce a pulsed electron beam that propagates in the same direction as the laser. Numerous laboratories have demonstrated that there is a high intensity regime where the electron beam can have a modest energy spread. For very high energies, it may be necessary to use a capillary discharge to produce a hollow plasma column to guide the laser pulse and extend the interaction distance. As discussed in (c) and (d) above, the electrons can be used to produce x-rays.

(f) Energetic ions: Energetic ions can also be produced through the interaction of the intense laser pulse with a thin solid target. There are several mechanisms involved, but typically, most ions come off the back side of the target are accelerated by extremely high electric fields in the electron space charge layer or sheath. This process is termed target normal sheath acceleration (TNSA). Producing multi-MeV ions in substantial quantities requires very high laser intensities, but the process has been demonstrated by numerous laboratory experiments. The use of laser generated ions to produce pulsed neutron sources is discussed below.

(g) Neutrons: Neutrons can be generated through a variety of reactions involving the interaction of energetic ions with solid targets. A laser-driven neutron source typically involves a layered target where the for layer produces an ion beam through TNSA, and the second laser contains material which interactions with the ion beam through a nuclear reaction that generates neutrons. The neutrons can be used to probe objects for the presence of explosives or nuclear material. There are a huge range of neutron based detection schemes involving conventional ion beam sources, and most could in principle be adapted to a laser-based quasi-remote detection scheme.

Modeling Examples

Model calculations of stretched pulse propagation: In laboratory experiments, the inventors of the present invention have not demonstrated that the ability to axially compress and radially focus the expanded, stretched pulse is not seriously degraded by the interaction with the air. The following model calculations are intended to illustrate the extent to which turbulence and other laser propagation effects modifies the stretched pulse as it propagates to the remote platform and degrades the ability to focus the compressed pulse to high intensity.

Provided the intensity of the stretched and expanded pulse is kept sufficiently low to avoid ionization effects, the dominant process affecting the propagation of the stretched pulse appears to be atmospheric turbulence.

As noted above, atmospheric turbulence can significantly affect the ability to compress and focus the pulse to high intensities. In particular, beam wander can be significant. The wander during an individual pulse should be negligible due to the short pulse length. However, in the case of a train of pulses or in the case of an intrinsic alignment uncertainty of a single pulse due to turbulence, beam wander may come into play.

Figure 5:
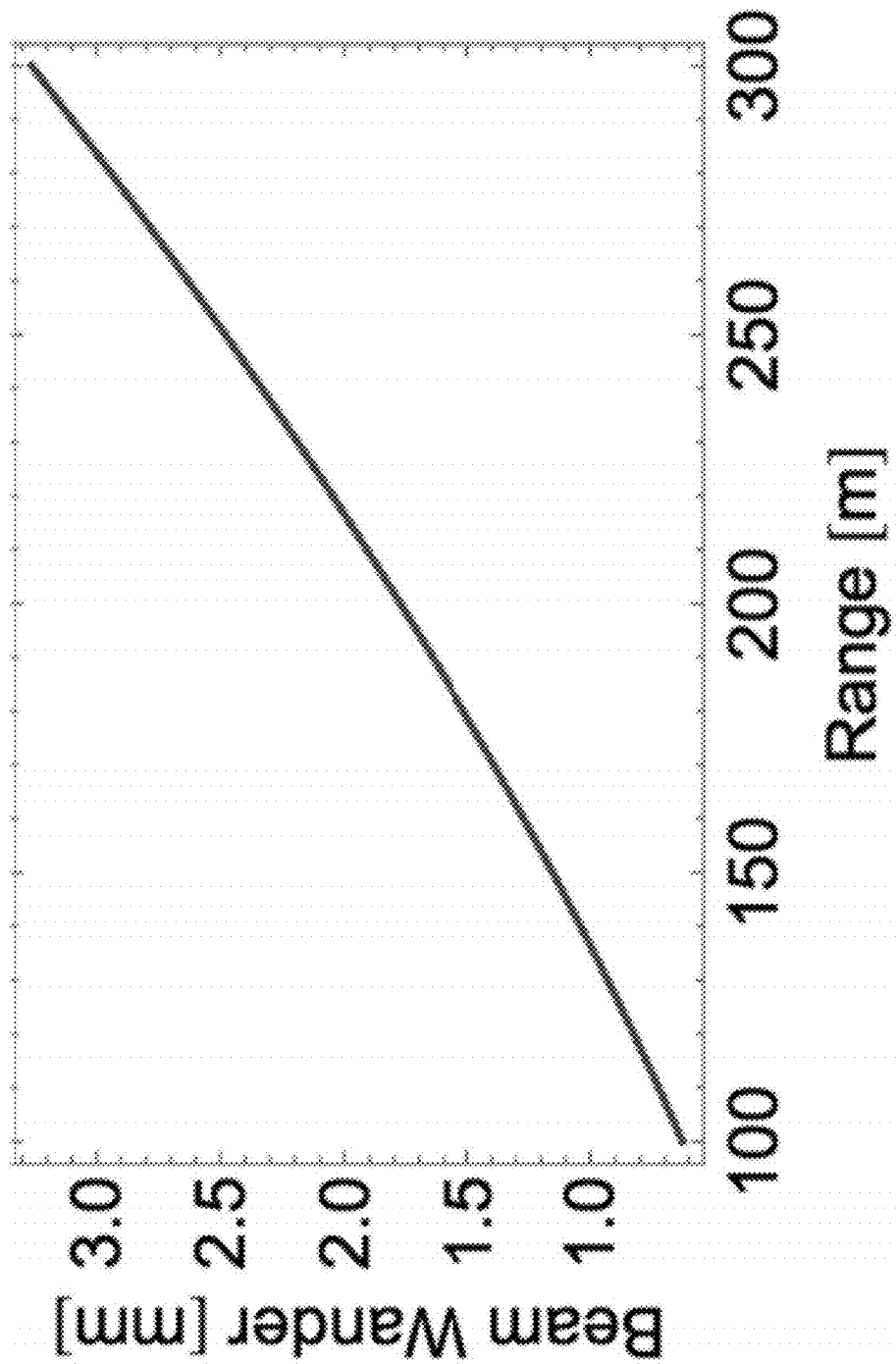
FIG. 5 is a plot showing the beam centroid wander $R_w$ as a function of propagation distance for a 5 cm radius laser pulse in turbulent with a refractive index structure constant $C_n^2=10^{-14} \text{m}^{-2/3}$.
Figure 6:
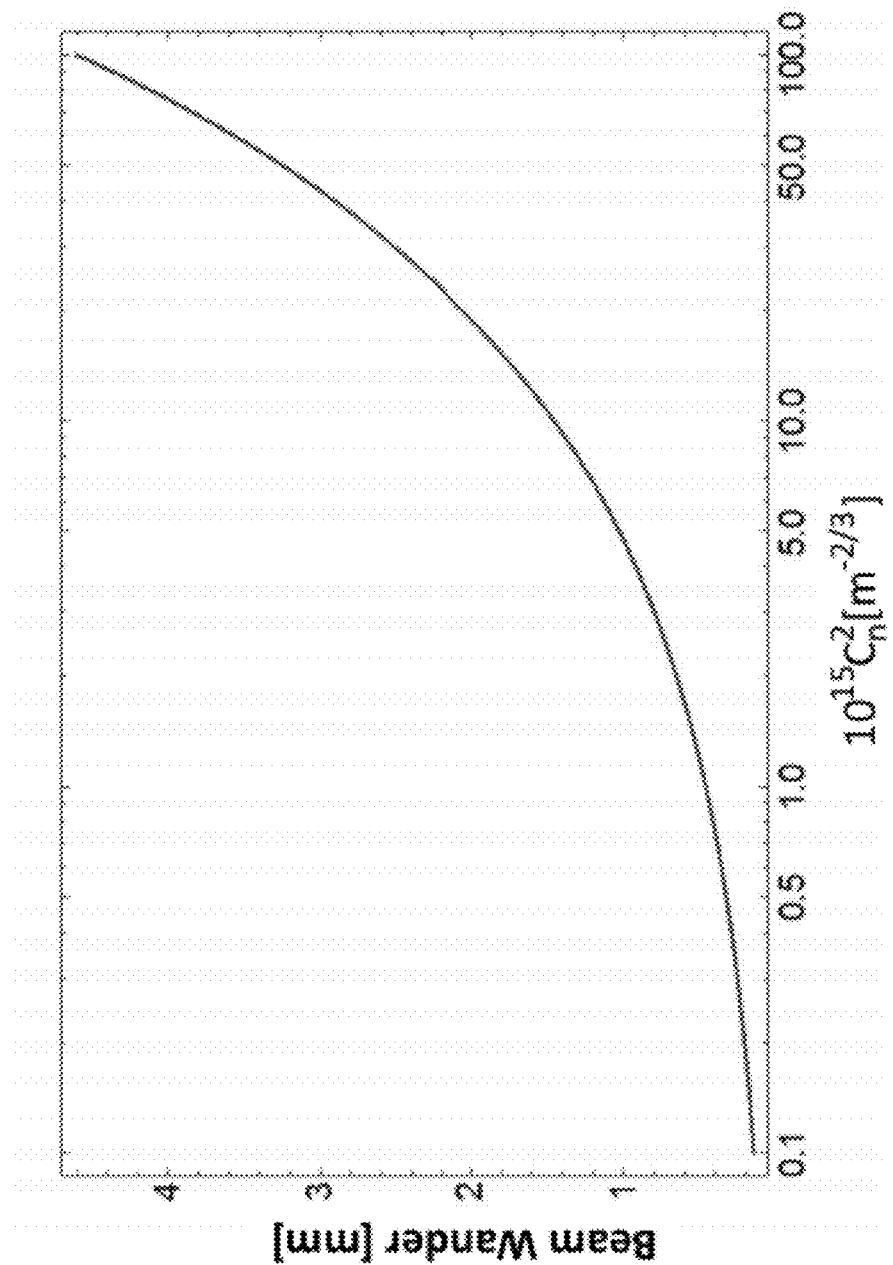
FIG. 6 plots the beam centroid wander versus $C_n^2$ after 300 m of propagation for the case shown in FIG. 5.

For the example considered here, a stretched laser pulse with an initial spot size of 5 cm and wavelength of 0.8 microns propagates in the atmosphere with refractive index structure constant assumed equal to $C_n^2=10^{-14} m^{-2/3}$. FIG. 5 shows the beam wander as a function of propagation range, capsulated from Eq. (5). The wander is relatively small, approximately equal to 1.5 mm at a range of 300 m. However, it is sufficiently large that tip/tilt corrections will probably be required in order to compress and focus the beam at the remote platform. FIG. 6 plots the beam wander after 300 m of propagation as a function of $C_n^2$, again using Eq. (5). The beam wander increases significantly as the degree of turbulence ($C_n^2$)) increases. One can in principle characterize the degradation in beam quality from turbulence by using Eq. (7) to estimate $M_{eff}^2$. However, comparisons with a simulation model described later in this paper suggest that this equation significantly underestimates $M_{eff}^2$.

Model calculation of focused spot size degradation by turbulence: After propagating through the atmosphere, the stretched pule is compressed in time and then is focused by an optic (e.g., lens or off-axis paraboloidal minor) with focal length f. If one assumes that beam wander has been corrected for, the effective turbulence-corrected beam quality $M_{eff}^2$ may be used to estimate focused spot size $w_f$ $$w_f = M_{eff}^2 \frac{\lambda f}{\pi \rho_s} \frac{1}{\sqrt{1+(f/Z_R)^2}}. \tag{8}$$

However, as described above, a system in accordance with the present invention can include adaptive optics on the main platform to remove phase front errors that that are induced by atmospheric turbulence as the stretched beam propagates to the remote platform. A system in accordance with the present invention can also include full phase adaptive optics on the remote platform, either with or without adaptive optics on the main platform, to further account for wander or other effects of the atmosphere on the beam that degrade the ability to focus the compressed pulse.

HELCAP simulations of pulse propagation, longitudinal compression and focusing: The inventors modeled the propagation of the laser pulse over several hundreds of meters of air using the High Energy Laser Code for Atmospheric Propagation (HELCAP) code developed at the Naval Research Laboratory. See Sprangle 2002, Sprangle 2003, and Sprangle 2009, supra. The simulation model relaxes a number of simplifying assumptions contained in the analytical models described in Eqs. (4-8).

HELCAP is a 3D time-dependent computer simulation and models the linear and nonlinear propagation of high-powered, pulsed laser beams through the atmosphere. The code self-consistently solves a coupled system of equations describing the evolution of the laser envelope and the surrounding medium. Physical processes modeled include diffraction, group velocity (and higher order) dispersion, optical Kerr effects, e.g. self-phase modulation and nonlinear self-focusing, short pulse absorption, ionization, and relativistic plasma effects. In addition, the code contains fully time-dependent models for turbulence, thermal blooming, aerosol vaporization, and stimulated Raman scattering.

Figure 7:
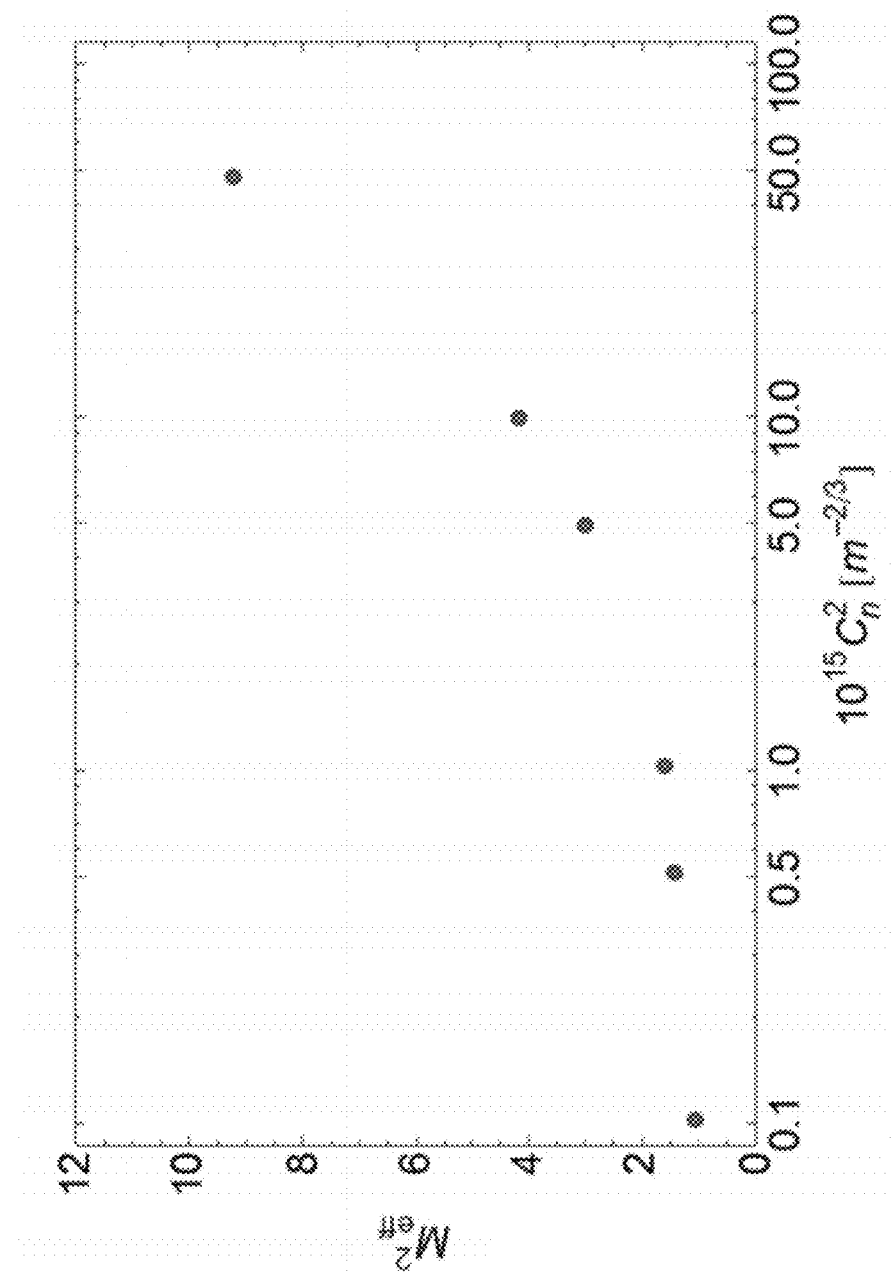
FIG. 7 plots the effective beam quality $M^2$ as a function of $C_n^2$ after 300 m of propagation for the case shown in FIG. 5.

In one series of simulations, HELCAP was used to propagate a 5 cm radius, 0.8 micron wavelength laser pulse a distance of 300 m in turbulent air with various values of $C_n^2$. Nonlinear and dispersion effects were neglected. The effective beam quality $M_{eff}^2$ was calculated directly from the simulation by comparing the root mean square (rms) focal spot size with that for an ideal Gaussian pulse propagating in vacuum. An artificially long (70 m) focal length was used since the HELCAP code has a fixed grid and cannot deal with large differences in the initial and final (focused) laser spot size. The results are given in FIG. 7, which plots $M_{eff}^2$ against $C_n^2$ after 300 m of propagation. The effective beam quality is close to unity for very weak turbulence levels but increases by an order of magnitude at the highest levels shown.

Figure 8:
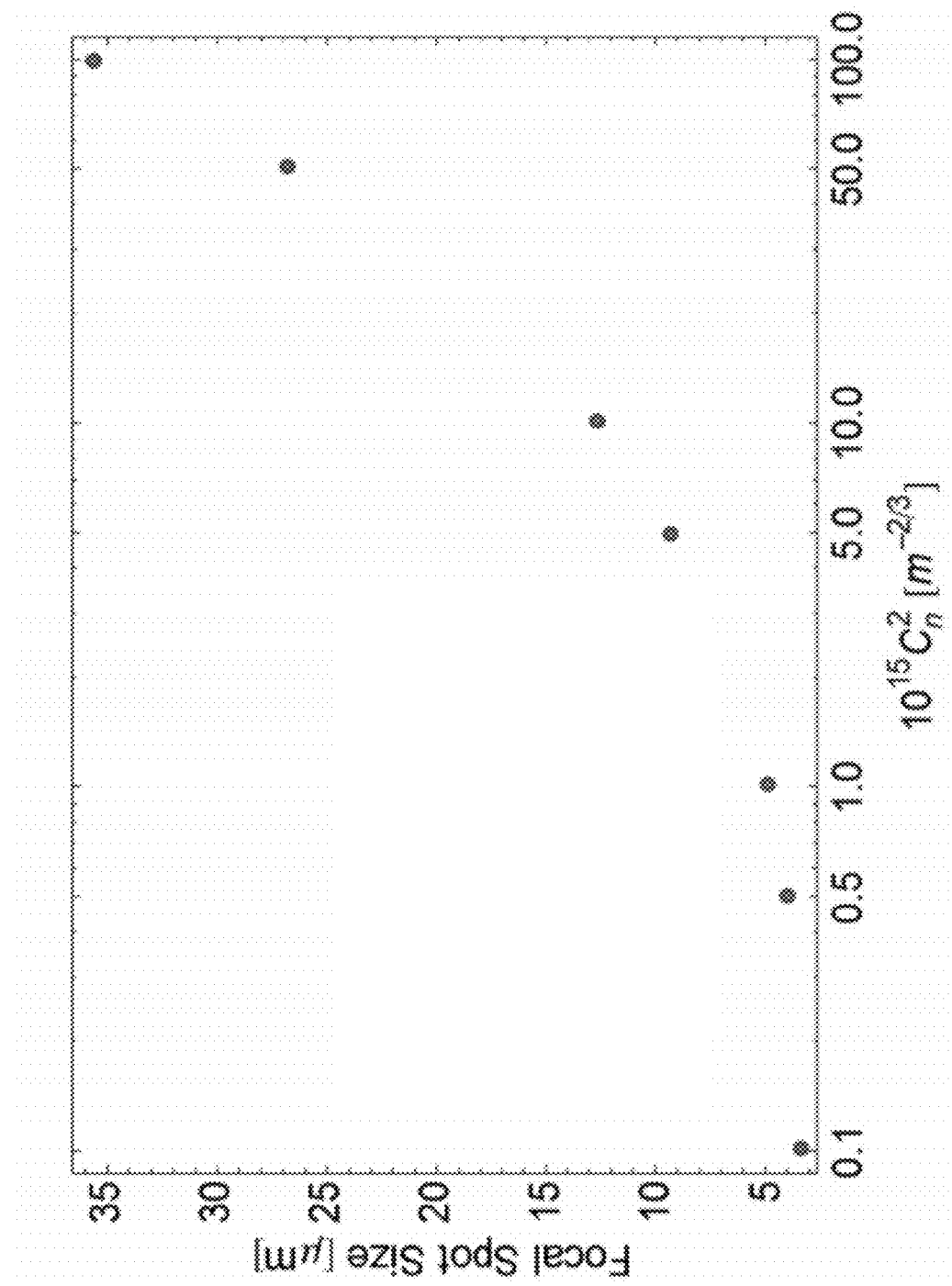
FIG. 8 plots the focused spot size as a function of $C_n^2$ assuming 300 m of stretched beam propagation for the case shown in FIG. 5, assuming a 60 cm focal length with beam wander removed by tip/tilt or other correction optics.
Figure 9:
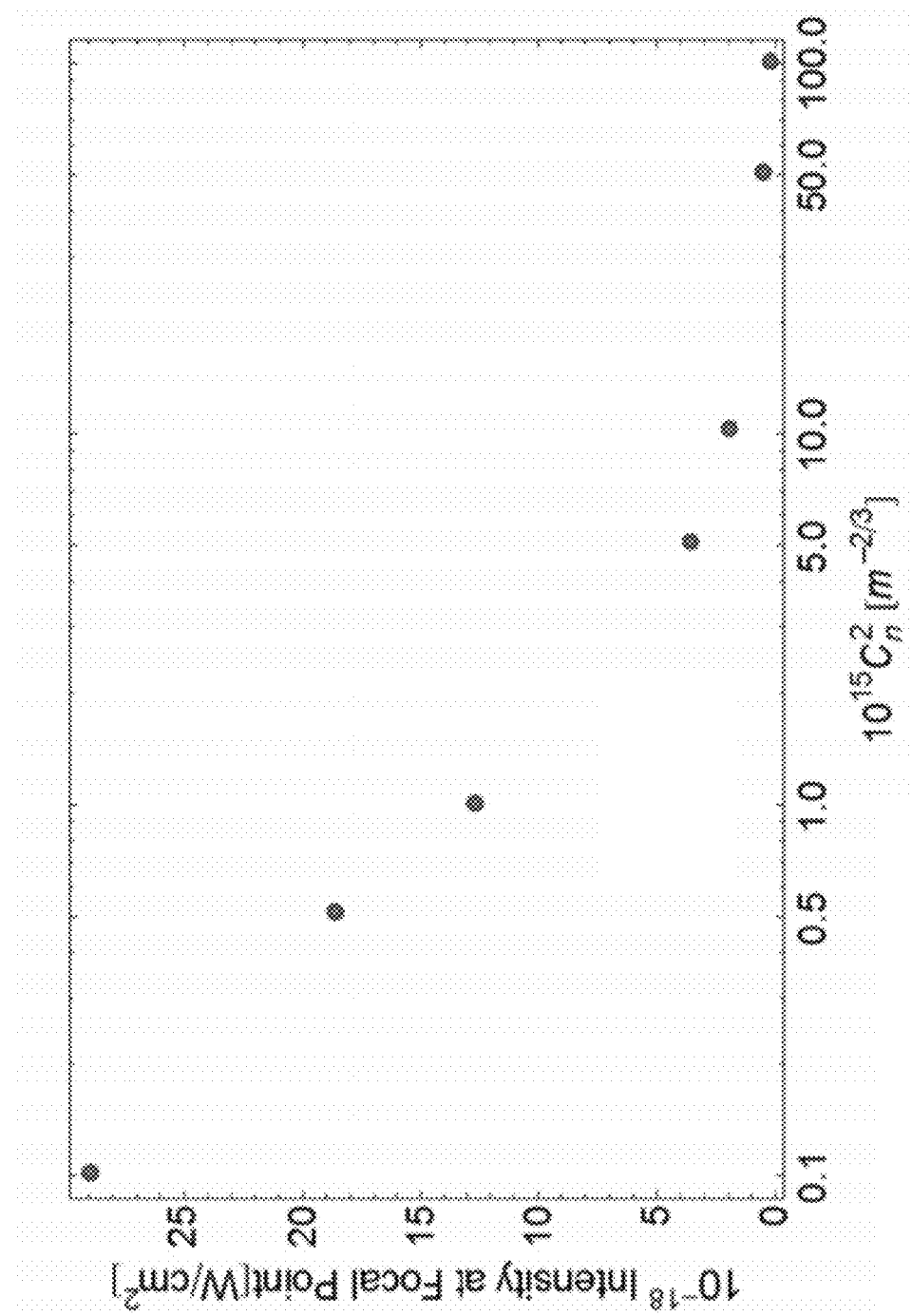
FIG. 9 plots the focused beam intensity versus $C_n^2$ for the case shown in FIG. 8 with a compressed beam power of 5 TW.

FIG. 8 plots the focused spot size as a function of $C_n^2$ assuming 300 m of propagation of the stretched pulse, followed by focusing in vacuum with a 60 cm focal length lens. The spot size was calculated from Eq. (8), using $M_{eff}^2$ from FIG. 7. The spot size increases from just over 3 microns at the lowest turbulence levels to 35 microns at the highest level. FIG. 9 plots the corresponding laser intensity at the focus, assuming the compressed laser pulse has a peak power of 5 TW. The intensity exceeds $10^{18}$ W/cm$^2$ even at relatively high turbulence levels, which is sufficient for many of the probe beam converters described previously. Since many USPL systems have powers far above this level, one may compensate for the degradation in the focused spot size in many cases by increasing the laser power.

In the example that follows, the inventors modeled a laser pulse that was compressed and focused after being propagated through 314 m of air with a turbulence index $C_n^2=10^{-14}$ m$^{-2/3}$. The laser pulse had a wavelength $\lambda=0.8$ μm and an initial spot size of 2 cm. The pulse was compressed using a simulated grating with phase delay derivatives $\phi''(\omega)/=7.7$ psec$^2$ and $\phi'''(\omega)/=-0.004$ psec$^3$, and subsequently focused with a lens with a 20 m focal length.

Figure 10B:
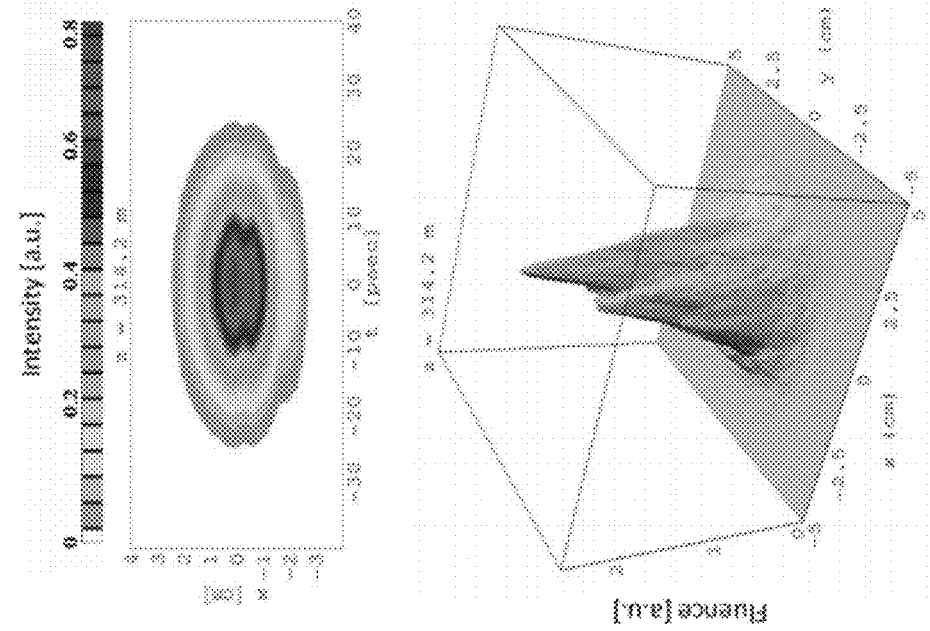
FIGS. 10A and 10B are plots illustrating aspects of laser pulse intensity and fluence for a chirped pulse from the main platform after it has been stretched at the main platform (FIG. 10A) and after it has propagated through the atmosphere and been received at the remote platform (FIG. 10B).
Figure 10A:
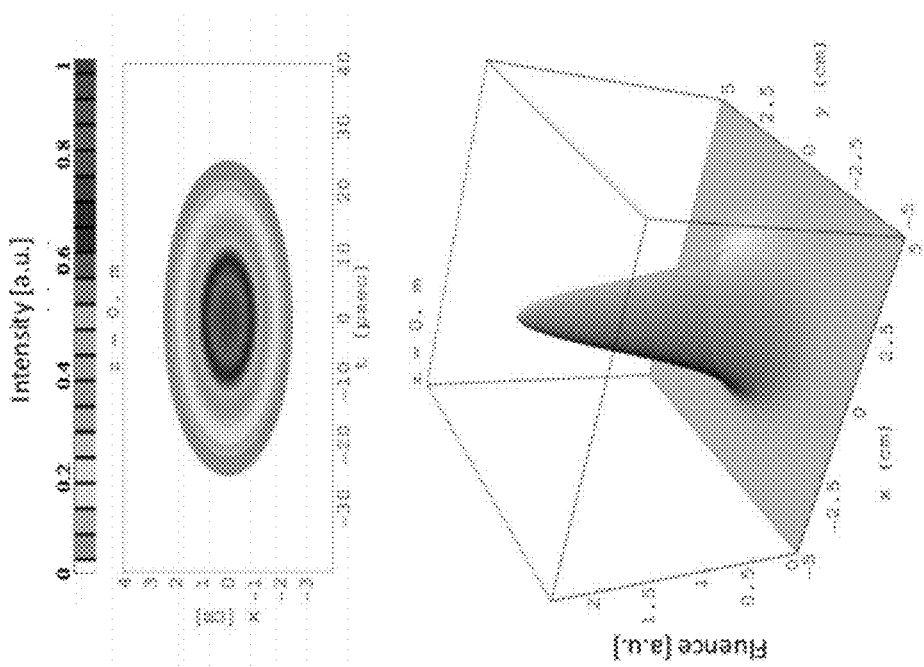

The results of the model are shown in FIGS. 10A/10B and 11A/11B.

FIG. 10A is a plot showing the laser intensity as a function of transverse coordinate, x, and time, and a surface plot of the time-integrated intensity (fluence) as a function of transverse coordinates x and y as the amplified, stretched beam leaves the beam director on the main platform in accordance with the present invention. FIG. 10B plots the same quantities after the laser pulse has propagated 314 m in air. The effects of turbulence on the laser pulse are evident; bulk properties such as pulse length and spot size are not strongly affected, but modest structure in intensity and fluence are produced.

Figure 11B:
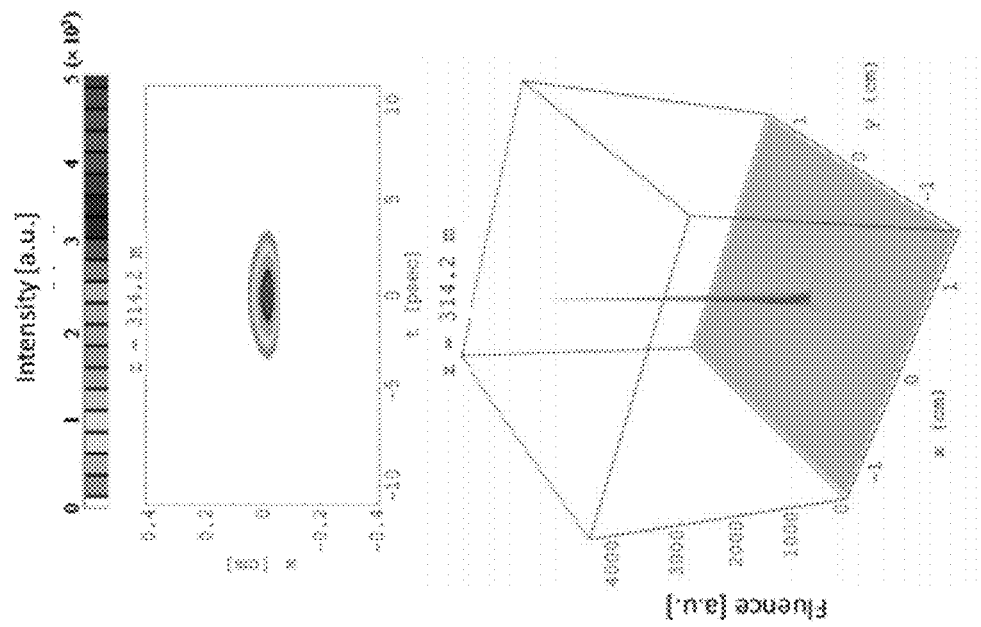
FIGS. 11A and 11B are plots illustrating aspects of laser pulse intensity and fluence for a chirped pulse received at the remote platform after it has been compressed (FIG. 11A) and focused (FIG. 11B) in accordance with the present invention.
Figure 11A:
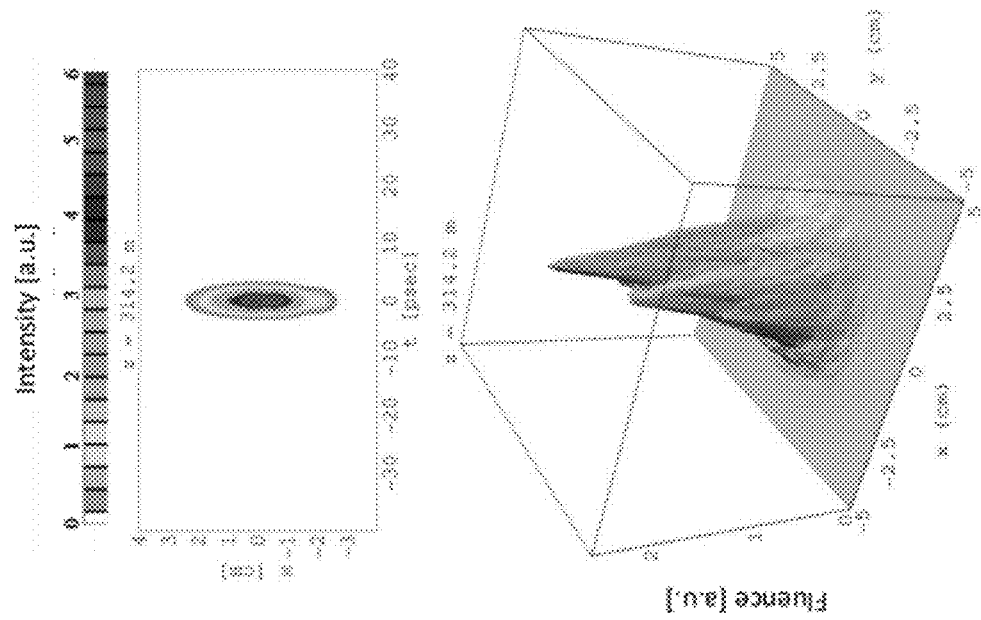

The plots in FIGS. 11A and 11B illustrate the laser intensity and fluence of the pulse after compression at the remote platform in accordance with the present invention, where the pulse length was decreased from ~20 psec to ~3 psec (FIG. 11A) and then focused (FIG. 11B). It should be noted that the scale of the plots in FIG. 1B is very different from the scale of the plots in FIG. 11A and this difference in scale should be taken into account when considering the effects of the pulse compression in accordance with the present invention. Thus, as can be seen from the plot in FIG. 11B, the spot size of the compressed and focused pulse is decreased to a dimension comparable to the simulation grid size, resulting in an intensity increase of a factor of ~2000.

It should also be noted that the artificially long (20 m) focal length of the focusing element used in the HELCAP model produces a focused spot size that is much larger than what could be obtained in an actual device and was chosen because of the limited grid resolution or dynamic range of the simulation. In most applications, the focal length would be two orders of magnitude smaller. Even is this simulation case, the actual turbulence-limited spot size for this example is smaller than the simulation grid size and has not been resolved accurately. Similarly, axial gridding constraints limited the longitudinal pulse compression, and there was no attempt to optimize this process. Again, the degree of compression achievable in laboratory devices is far higher than in this simulation.

Advantages and New Features

This quasi-remote laser pulse compression and probe beam conversion architecture of the present invention encompasses a huge range of potential systems and applications. Very few competing systems can produce a concentrated burst of probing radiation or energetic particles close to a distant target in any form, so direct comparison is difficult.

Generic positive features: The quasi-remote laser pulse compression (QRPC) and probe beam conversion architecture of the present invention has several generic positive features. Perhaps most important, although the implementation will be complex and challenging in practice, almost all of the probe beam conversion methods proposed here have been demonstrated in the laboratory using the conventional ultrashort pulse laser (USPL) configuration in which the pulse compressor is at a fixed location near the other components on the primary platform, and the laser is focused onto a radiation or particle beam converter which is also fixed. The propagation of both ultrashort laser pulses and longer pulsed or continuous high energy laser (HEL) beams over substantial distances has also been demonstrated, and as discussed in the Background section, the processes that limit the ability to propagate these beams have been studied and the basic limitations are reasonably understood.

What has not yet been demonstrated experimentally is the extent to which these processes degrade the ability of the stretched laser to be compressed axially and focused radially to the level required for a particular probe beam source or application. However, based on the analysis, it appears that propagation over hundreds of meters will be possible. The use of turbulence compensation techniques such as adaptive optics and active beam wander compensation could extend this range substantially. The QRPC architecture makes it possible to provide a "guide star" for adaptive optics and other compensating optics on the remote platform.

It is also useful to compare the system and methods of the present invention with several classes of related devices.

Comparison with conventional large particle beam driven sources: For penetrating probing radiation such as x-rays or neutrons, the most common approaches involve using a conventional high energy accelerator to produce electrons or ions which then impact a target to produce the probe beam. The drive beam source (accelerator) and probe beam convertor are co-located. Such devices may take many forms, but they are usually inherently large and thus difficult to get close to the target. There have been some attempts to extend the range by increasing the power and energy of the drive beam, narrowing the divergence of the probe beam, and/or using very sensitive detectors. However, this exacerbates the serious problems associated with ionizing radiation, including in some cases, producing substantial radioactive contamination near the target and along the beam path. One could conceive a quasi-remote probe beam conversion system using a conventional particle beam, but long-range propagation of such beams in the open atmosphere is difficult (if not essentially impossible) due to a range of issues (massive collisional and bremsstrahlung radiation losses, small angle multiple scattering, and virulent beam-plasma instabilities).

Comparison with ultra-compact portable probe beam sources: There are probe beam radiation sources that might fit on the same type of small, remote platform that is being proposed for the QRPC architecture. Examples include compact, moderate voltage x-ray sources and "logging" neutron sources used in the petroleum industry. These local active detection systems share some of the features of the class of systems proposed here, but the power and penetrating ability of the probe radiation may be severely limited. The "power beaming" aspects of the QRPC system may in principle allow substantially more power to be transported, and USPL systems can produce particle beams with substantially higher energy than ultra-compact systems based on more conventional technologies.

Comparison with other USPL-based systems: USPL-based probe beam concepts fall into two generic classes. In one, the compressed USPL drive beam and probe beam converter are co-located, as shown in FIG. 1. These concepts take advantage of the relatively compact size of USPL systems compared with typical conventional accelerator-based systems, and are primarily geared towards penetrating radiation such as x-rays, ions, or neutrons. However, for applications that require substantial laser pulse intensity in the converter and/or substantial average power, current USPL systems may still be quite large. For applications requiring substantial standoff distances or the ability to get the probe beam source close to the target, these concepts have some of the same limitations as do the conventional particle beam sources. The second class of concepts involves propagating the compressed USPL pulse in the atmosphere and producing radiation due some nonlinear process in the air or target. These approaches may produce UV, infrared, or terahertz radiation suitable for those applications where penetrating probe beam is not required. For non-penetrating (UV) or weakly penetrating (THz) radiation applications, the QRPC methods may produce substantially more radiation than the purely remote approaches and there is generally more control over where the radiation is produced. Note that the USPL intensity close to the target in this second class of concepts is orders of magnitude below what is required to produce x-rays or energetic particle beams.

In addition, although in many cases, the probe beam is used to analyze or detect the target object or area using imaging or spectroscopic techniques, in other cases probe beam can be used to modify the target object. For example, the system of the present invention can be used in medical applications where the target object is a cancer tumor, with the probe beam being an ion beam used for cancer therapy.

Alternatives

Base configuration: In general, a quasi-remote laser pulse compression system in accordance with the present invention will include the chirped pulse amplification components shown in FIG. 3A, with the pulse compressor and final focusing and aiming optics located on a separate (remote) platform (FIG. 3B) that may be moved to a different location. Since the remote platform and/or optics on that platform may be moved to a different location, the main platform will usually also contain a beam director and a tracking system to locate precisely the beam capture optics on the remote platform that send the stretched laser pulse to the compressor. The compressed pulse can then be focused onto a probe beam converter that generates a local source of electromagnetic radiation or energetic particles that can be used for imaging, spectroscopy, or other applications.

Alternative laser configurations: The most common forms of chirped pulse amplification (CPA) systems use Titanium-doped sapphire (Ti:sapphire) as the amplification medium and diffraction grating pairs for the longitudinal pulse stretching and compression. Ti:sapphire lasers have a very large bandwidth and the ability to produce extraordinarily intense pulses. However, other laser host materials have sufficient bandwidth to employ these techniques, many of the applications to not require extreme beam power or intensities, and some lasers have other properties (cost, ruggedness, compactness) that may make them more suitable for fielding.

There are other options for stretchers and compressors, including optical fibers for stretching and grisms for pulse compression.

Alternative beam director, beam capture, and tracking systems: The details of these subsystems have not been discussed, and it is obvious the current state of the art offers many possibilities. A primary option in cases where there is no attempt to compensate for phase distortions produced by atmospheric turbulence is to have an active system with fast, steerable mirrors to correct for turbulence-induced beam wander.

Options for turbulence corrections: Calculations indicate that the degradation in the ability to compress and focus the stretched laser pulse may be modest over distances of a few hundred meters. Thus, for applications that do not require very large focused laser intensity or extremely short pulse lengths, turbulence correction may not be necessary. In principle, adaptive optics and other turbulence correction methods developed for high energy lasers may be employed. Quasi-remote systems have two important features that make adaptive optics much easier. First, the "guide star" required as a target for these techniques may be placed directly on the remote platform. Second, compensation optics may also be placed on the remote platform as part of the stretched pulse capture system.

Options for producing different forms of radiation or energetic particles: As described above, a quasi-remote pulse compression system in accordance with the present invention can be used to produce many different forms of radiation or energetic particles at the remote platform. Radiation options include ultraviolet, terahertz, broadband x-rays, and narrowband x-rays. Energetic particle beam options include electrons, ions, and neutrons, with some of these particles used in a later stage to produce electromagnetic radiation.

Options for multiple remote platforms and multi-purpose probe beam converters: A single, large amplifier and stretcher may be used to send stretched beams to multiple remote platforms. Each platform would have its own beam capture optics, pulse compressor, probe beam converter, etc. Similarly, in some cases, a single probe beam converter could be converted to produce multiple forms of radiation or particle beams. In most cases, this would involve placing a difference target assembly at the focal location of the compressed beam. For example, a probe beam converter designed to accept thin, solid targets could in principle be configured remotely to produce x-rays, ions, or neutrons.

Applications that do not involve probe beam conversion: The quasi-remote pulse compression architecture may also be used for applications where the compressed laser pulse is focused directly onto a target or object located on or close to the remote platform. This could be for the purpose of modifying the target through ablation or other processes that affect the surface of the target. It could also be for the purpose of generating a spectral signature directly from the target through a process that does not require the generation of a probe beam.

Although particular embodiments, aspects, and features have been described and illustrated, one skilled in the art would readily appreciate that the invention described herein is not limited to only those embodiments, aspects, and features but also contemplates any and all modifications within the spirit and scope of the underlying invention described and claimed herein, and such combinations and embodiments are within the scope of the present disclosure.

What is claimed is:

1. A system for generating a high-intensity focused laser pulse, comprising:
    a main platform and a remote platform located at a distance from the main platform;
    the main platform including:
        a laser source configured to emit a seed pulse having a first pulse length and a first intensity,
        a pulse stretcher configured to receive the seed pulse from the laser source and to stretch the seed pulse to form a stretched pulse having a second pulse length longer than the first pulse length,
        a laser amplifier configured to receive the stretched pulse from the pulse stretcher and to amplify the stretched pulse to form an amplified stretched pulse having an energy much greater than the unamplified stretched pulse, and
        a beam director and tracking optics, the beam director being configured to receive the amplified stretched pulse from the laser amplifier, the beam director and tracking optics being configured to direct or steer the amplified stretched pulse to the remote platform, and the beam director and tracking optics being further configured to provide rapid steering corrections to compensate for relative motion between the main platform, remote platform, and/or the stretched pulse as it propagates from the main platform to the remote platform; and
    the remote platform including:
        beam capture optics configured to receive the amplified stretched pulse from the main platform;
        a pulse compressor configured to receive the amplified stretched pulse from the beam capture optics and to longitudinally compress the amplified stretched pulse into a compressed laser pulse having a third pulse length comparable with the initial seed pulse length and
        focusing and aiming optics configured to receive the compressed laser pulse from the pulse compressor and to transversely compress the compressed laser pulse to form the high-intensity focused laser pulse, the high-intensity focused laser pulse having a third intensity much higher than the first intensity of the seed pulse at the main platform;
    wherein the seed pulse generated at the main platform is converted to the high-intensity focused laser pulse at the remote platform.

2. The system according to claim 1, wherein the distance between the main platform and the remote platform is sufficient to require fast steering corrections of the amplified stretched pulse as it travels from the main platform to the remote platform.

3. The system according to claim 1, wherein the pulse stretcher is configured to apply a frequency chirp to the seed pulse.

4. The system according to claim 1, wherein the laser amplifier comprises Ti:sapphire or other large bandwidth bulk material.

5. The system according to claim 1, wherein the laser amplifier comprises a large bandwidth doped optical fiber.

6. The system according to claim 1, wherein the pulse stretcher comprises a diffraction grating pair configured to stretch the seed pulse from the first length to the second length.

7. The system according to claim 1, wherein the pulse stretcher comprises an optical fiber configured to stretch the seed pulse from the first length to the second length.

8. The system according to claim 1, wherein the pulse compressor comprises a diffraction grating pair configured to compress the amplified stretched pulse from the second length to the third length.

9. The system according to claim 1, wherein the pulse compressor comprises a grism configured to compress the amplified stretched pulse from the second length to the third length.

10. The system according to claim 1, wherein the beam director comprises a tip/tilt system having fast mirrors configured to correct for turbulence-induced wander in the amplified stretched pulse directed to the remote platform.

11. The system according to claim 1, wherein the main platform further includes an adaptive optics system configured to correct for turbulence-induced distortions in at least one phase front of the amplified stretched pulse directed to the remote platform.

12. The system according to claim 1, wherein the beam capture optics comprise a tip/tilt system having fast mirrors configured to correct for turbulence-induced wander in the amplified stretched pulse received at the remote platform.

13. The system according to claim 1, wherein the beam capture optics includes an adaptive optics system configured to correct for turbulence-induced distortions in at least one phase front of the amplified stretched pulse received at the remote platform.

14. The system according to claim 1, wherein the remote platform further includes a beacon configured to assist with one or more of aiming, alignment, and turbulence correction optics on the main platform.

15. The system according to claim 1, wherein the remote platform is mobile relative to the main platform.

16. The system according to claim 1, wherein the system includes a plurality of remote platforms and wherein the beam director and tracking optics are configured to direct the amplified stretched pulse to any one or more of the plurality of remote platforms.

17. The system according to claim 1, wherein the remote platform further includes a probe beam converter configured to convert the high-intensity focused laser pulse to a different kind of radiation or particle beam.

18. The system according to claim 17, wherein the probe beam converter is configured to convert the high-intensity focused laser pulse to a pulse of ultraviolet radiation.

19. The system according to claim 17, wherein the probe beam converter is configured to convert the high-intensity focused laser pulse to a pulse of terahertz radiation.

20. The system according to claim 17, wherein the probe beam converter is configured to convert the high-intensity focused laser pulse to a pulse of broadband x-ray radiation.

21. The system according to claim 17, wherein the probe beam converter is configured to convert the high-intensity focused laser pulse to a pulse of narrowband x-ray radiation.

22. The system according to claim 17, wherein the probe beam converter is configured to convert the high-intensity focused laser pulse to a pulsed electron beam.

23. The system according to claim 17, wherein the probe beam converter is configured to convert the high-intensity focused laser pulse to a pulsed ion beam.

24. The system according to claim 17, wherein the probe beam converter is configured to convert the high-intensity focused laser pulse to a pulse of neutrons.

25. The system according to claim 17, wherein the probe beam converter includes a solid target.

26. The system according to claim 25, wherein the solid target includes one of a bulk solid, a wire, or one or more a thin foils.

27. The system according to claim 17, wherein the probe beam converter includes a liquid target.

28. The system according to claim 27, wherein the liquid target includes a liquid stream or one or more liquid droplets.

29. The system according to claim 17, wherein the probe beam converter includes a gaseous target.

30. The system according to claim 29, wherein the gaseous target includes a pulsed gas jet or a gas confined in a gas cell.

31. The system according to claim 17, wherein the probe beam converter includes a cluster target.

32. The system according to claim 17, wherein the probe beam converter includes a plasma target.

33. The system according to claim 32, wherein the plasma target includes a capillary discharge plasma or other preionized plasma source.

34. A quasi-remote laser standoff detection system, comprising:
a main platform at which a drive beam in the standoff detection system is generated and a remote platform at which a probe beam in the standoff detection system is generated, the remote platform being located at a distance from the main platform sufficient to require fast steering corrections of the drive beam as it travels from the main platform to the remote platform;
the main platform including:
a laser source configured to emit a seed pulse having a first pulse length and a first intensity,
a pulse stretcher configured to receive the seed pulse from the laser source and to stretch the seed pulse to form a stretched pulse having a second pulse length longer than the first pulse length,
a laser amplifier configured to receive the stretched pulse from the pulse stretcher and to amplify the stretched pulse to form an amplified stretched pulse having an energy substantially greater than the unamplified stretched pulse, and
a beam director and tracking optics, the beam director being configured to receive the amplified stretched pulse from the laser amplifier, the beam director and tracking optics being configured to direct or steer the amplified stretched pulse to the remote platform, and the beam director and tracking optics being further configured to provide rapid steering corrections to compensate for relative motion between the main platform, remote platform, and/or the amplified stretched pulse as it propagates from the main platform to the remote platform, the amplified stretched pulse forming the drive beam in the remote standoff detection system; and
the remote platform including:
beam capture optics configured to receive the amplified stretched pulse from the main platform;
a pulse compressor configured to receive the amplified stretched pulse from the beam capture optics and to longitudinally compress the amplified stretched pulse into a compressed laser pulse having a third pulse length comparable with the initial seed pulse length,
focusing and aiming optics configured to receive the compressed laser pulse from the pulse compressor and to transversely compress the compressed laser pulse to form a high-intensity focused laser pulse, the high-intensity focused laser pulse having a third intensity higher than the first intensity of the chirped laser pulse at the main platform, and
a probe beam converter and aiming optics configured to receive the high-intensity focused laser pulse and to convert the high-intensity focused laser pulse to a probe beam aimed at a target object.

35. The standoff detection system according to claim 34, wherein the remote platform further includes at least one detector configured to receive a return signal from a target object irradiated by the probe beam.

36. A method for generating a high-intensity focused laser pulse, comprising:
generating a seed pulse having a first pulse length and a first intensity at a main platform;
stretching the seed pulse at the main platform to form a stretched pulse having a second pulse length longer than the first pulse length,
amplifying the stretched pulse to form an amplified stretched pulse having an energy much greater than the unamplified stretched pulse;
directing the amplified stretched pulse to a remote platform, the amplified stretched pulse being subjected to rapid steering corrections to compensate for relative motion between the main platform, remote platform, and/or the stretched pulse as it propagates from the main platform to the remote platform;
longitudinally compress the amplified stretched pulse at the remote platform to form a compressed laser pulse having a third pulse length comparable with the initial seed pulse length and
transversely compressing the compressed laser pulse to form the high-intensity focused laser pulse, the high-intensity focused laser pulse having a third intensity much higher than the first intensity of the seed pulse at the main platform.

* * * * *